United States Patent

Geirhofer et al.

(10) Patent No.: US 9,426,703 B2
(45) Date of Patent: Aug. 23, 2016

(54) COOPERATION AND OPERATION OF MACRO NODE AND REMOTE RADIO HEAD DEPLOYMENTS IN HETEROGENEOUS NETWORKS

(75) Inventors: Stefan Geirhofer, San Diego, CA (US); Tingfang Ji, San Diego, CA (US); Peter Gaal, San Diego, CA (US); Aleksandar Damnjanovic, Del Mar, CA (US); Juan Montojo, San Diego, CA (US); Tao Luo, San Diego, CA (US); Wanshi Chen, San Diego, CA (US); Kapil Bhattad, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/349,073

(22) Filed: Jan. 12, 2012

(65) Prior Publication Data

US 2012/0207105 A1 Aug. 16, 2012

Related U.S. Application Data

(60) Provisional application No. 61/442,129, filed on Feb. 11, 2011, provisional application No. 61/442,690, filed on Feb. 14, 2011, provisional application No. 61/442,087, filed on Feb. 11, 2011.

(51) Int. Cl.
*H04W 72/08* (2009.01)
*H04W 36/00* (2009.01)
(Continued)

(52) U.S. Cl.
CPC ........ *H04W 36/0077* (2013.01); *H04L 5/0032* (2013.01); *H04L 5/0051* (2013.01);
(Continued)

(58) Field of Classification Search
CPC ............ H04W 72/08; H04W 36/0077; H04L 5/0032; H04L 5/0051; H04L 5/0057; H04L 5/0023; H04L 5/005; H04L 5/006; H04L 25/0226

USPC ......................................................... 370/329
See application file for complete search history.

(56) References Cited

U.S. PATENT DOCUMENTS 6,549,787 B1 4/2003 Ravi
8,208,434 B2 6/2012 Sayana et al.
(Continued)

FOREIGN PATENT DOCUMENTS

CN 101777941 A 7/2010
CN 101841357 A 9/2010
(Continued)

OTHER PUBLICATIONS

CATT: "Design of reference signals for relay backhaul link in LTE-A", R1-094152, 3rd Generation Partnership Project (3GPP), Mobile Competence Centre; 650, Route Des Lucioles; F-06921 Sophia-Antipolis Cedex; France, no. Miyazaki, Oct. 12, 2009, XP050388622, [retrieved on Oct. 6, 2009].

(Continued)

*Primary Examiner* — Andrew Chriss
*Assistant Examiner* — Ellen A Kirillova
(74) *Attorney, Agent, or Firm* — Arent Fox LLP

(57) ABSTRACT

A method, an apparatus, and a computer program product for wireless communication are provided for separating control transmissions and data transmissions within the coverage area of a plurality of transmission/reception points or points that are geographically displaced, the plurality of points comprising a macro node and a plurality of remote radio heads (RRHs) coupled to the macro node. Separating control transmissions and data transmissions in the macro node/RRH configuration may allow UEs to be associated with one set of transmission points for data transmissions and the same set or a different set of transmission points for common control signaling. Separating control transmissions and data transmissions may also allow for faster reconfiguration of antenna ports used for UE data transmission compared with reconfiguration via a handover process.

43 Claims, 17 Drawing Sheets

(51) Int. Cl.
*H04L 25/02* (2006.01)
*H04L 5/00* (2006.01)

(52) U.S. Cl.
CPC ......... *H04L5/0057* (2013.01); *H04L 25/0226* (2013.01); *H04L 5/005* (2013.01); *H04L 5/006* (2013.01); *H04L 5/0023* (2013.01)

(56) References Cited

U.S. PATENT DOCUMENTS

| | | |
|---|---|---|
| 8,576,792 B2 | 11/2013 | Kim et al. |
| 8,599,711 B2 | 12/2013 | Hugl et al. |
| 8,712,399 B2 | 4/2014 | Chen et al. |
| 2005/0272472 A1 | 12/2005 | Goldberg et al. |
| 2006/0276227 A1 | 12/2006 | Dravida |
| 2007/0167181 A1 | 7/2007 | Ramesh et al. |
| 2008/0049791 A1 | 2/2008 | Tirkkonen et al. |
| 2008/0095036 A1 | 4/2008 | Gorokhov et al. |
| 2008/0316950 A1 | 12/2008 | Damnjanovic |
| 2009/0235176 A1 | 9/2009 | Jayanthi |
| 2009/0247067 A1 | 10/2009 | Li et al. |
| 2009/0253426 A1* | 10/2009 | Qiu et al. .................... 455/426.1 |
| 2009/0296635 A1 | 12/2009 | Hui et al. |
| 2010/0034175 A1 | 2/2010 | Xiao et al. |
| 2010/0056215 A1 | 3/2010 | Gorokhov et al. |
| 2010/0067592 A1* | 3/2010 | Goldhamer .................... 375/260 |
| 2010/0067627 A1 | 3/2010 | Lincoln et al. |
| 2010/0069122 A1 | 3/2010 | Ito |
| 2010/0075706 A1 | 3/2010 | Montojo et al. |
| 2010/0099428 A1 | 4/2010 | Bhushan et al. |
| 2010/0111065 A1 | 5/2010 | Noh et al. |
| 2010/0118989 A1 | 5/2010 | Sayana et al. |
| 2010/0177746 A1 | 7/2010 | Gorokhov et al. |
| 2010/0195635 A1 | 8/2010 | Maeda |
| 2010/0234037 A1 | 9/2010 | Terry et al. |
| 2010/0238824 A1 | 9/2010 | Farajidana et al. |
| 2010/0265874 A1 | 10/2010 | Palanki et al. |
| 2010/0272032 A1 | 10/2010 | Sayana et al. |
| 2010/0285810 A1 | 11/2010 | Ko et al. |
| 2010/0290413 A1 | 11/2010 | Kuwahara |
| 2010/0311349 A1 | 12/2010 | Koo et al. |
| 2010/0311437 A1 | 12/2010 | Palanki et al. |
| 2010/0317343 A1 | 12/2010 | Krishnamurthy et al. |
| 2010/0322227 A1 | 12/2010 | Luo |
| 2010/0323684 A1* | 12/2010 | Cai et al. .................... 455/422.1 |
| 2011/0026482 A1 | 2/2011 | Li et al. |
| 2011/0044250 A1 | 2/2011 | Han et al. |
| 2011/0075624 A1 | 3/2011 | Papasakellariou et al. |
| 2011/0085610 A1 | 4/2011 | Zhuang et al. |
| 2011/0103324 A1 | 5/2011 | Nam et al. |
| 2011/0122968 A1 | 5/2011 | Jongren et al. |
| 2011/0149894 A1 | 6/2011 | Luo et al. |
| 2011/0151886 A1 | 6/2011 | Grayson et al. |
| 2011/0170435 A1 | 7/2011 | Kim et al. |
| 2011/0170496 A1 | 7/2011 | Fong et al. |
| 2011/0176440 A1 | 7/2011 | Frank et al. |
| 2011/0176634 A1* | 7/2011 | Yoon et al. .................... 375/295 |
| 2011/0183669 A1 | 7/2011 | Kazmi |
| 2011/0188481 A1 | 8/2011 | Damnjanovic et al. |
| 2011/0194536 A1 | 8/2011 | Kim et al. |
| 2011/0194551 A1 | 8/2011 | Lee et al. |
| 2011/0199986 A1 | 8/2011 | Fong et al. |
| 2011/0244877 A1 | 10/2011 | Farajidana et al. |
| 2011/0256833 A1 | 10/2011 | Racz et al. |
| 2011/0256861 A1 | 10/2011 | Yoo et al. |
| 2011/0261673 A1 | 10/2011 | Luo et al. |
| 2011/0268050 A1 | 11/2011 | Farajidana et al. |
| 2011/0268077 A1 | 11/2011 | Wan et al. |
| 2011/0274188 A1 | 11/2011 | Sayana et al. |
| 2011/0275394 A1 | 11/2011 | Song et al. |
| 2011/0317657 A1* | 12/2011 | Chmiel et al. ................ 370/331 |
| 2011/0319025 A1 | 12/2011 | Siomina et al. |
| 2012/0057566 A1 | 3/2012 | Ahmadi |
| 2012/0088458 A1 | 4/2012 | Nogami et al. |
| 2012/0100844 A1 | 4/2012 | Baldemair et al. |
| 2012/0176939 A1 | 7/2012 | Qu et al. |
| 2012/0201163 A1 | 8/2012 | Joengren et al. |
| 2012/0207043 A1 | 8/2012 | Geirhofer et al. |
| 2012/0208541 A1 | 8/2012 | Luo et al. |
| 2012/0208547 A1 | 8/2012 | Geirhofer et al. |
| 2012/0213108 A1 | 8/2012 | Ji et al. |
| 2012/0213261 A1 | 8/2012 | Sayana et al. |
| 2012/0315859 A1 | 12/2012 | Lee, II et al. |
| 2013/0033998 A1 | 2/2013 | Seo et al. |
| 2013/0039203 A1 | 2/2013 | Fong et al. |
| 2013/0051240 A1 | 2/2013 | Bhattad et al. |
| 2013/0250913 A1 | 9/2013 | Geirhofer et al. |
| 2015/0146673 A1 | 5/2015 | Geirhofer et al. |

FOREIGN PATENT DOCUMENTS

| | | |
|---|---|---|
| CN | 101917729 A | 12/2010 |
| CN | 101932025 A | 12/2010 |
| JP | 2010068496 A | 3/2010 |
| JP | 2011004212 A | 1/2011 |
| JP | 2012519998 A | 8/2012 |
| KR | 20070106391 A | 11/2007 |
| KR | 20100084102 A | 7/2010 |
| WO | 2010039066 A1 | 4/2010 |
| WO | 2010100077 A1 | 9/2010 |
| WO | 2010106819 A1 | 9/2010 |
| WO | WO2010106549 A2 | 9/2010 |
| WO | 2010122818 A1 | 10/2010 |
| WO | 2010126711 A1 | 11/2010 |
| WO | 2010150898 A1 | 12/2010 |
| WO | WO2011009486 A1 | 1/2011 |
| WO | WO 2011009486 A1 * | 1/2011 |
| WO | WO2011020062 A2 | 2/2011 |
| WO | WO 2011020062 A2 * | 2/2011 |
| WO | WO2011057037 A2 | 5/2011 |
| WO | WO 2011057037 A2 * | 5/2011 |
| WO | WO2011100672 A1 | 8/2011 |
| WO | 2012059139 A1 | 5/2012 |
| WO | 2012116022 A1 | 8/2012 |
| WO | 2013007207 A1 | 1/2013 |

OTHER PUBLICATIONS

Discussion on RS Design for Higher-order MIMO in LTE-A Document for Discussions, 3GPP Draft; R1-091591 (Nortel-RS Design For MIMO In LTE-A), 3rd Generation Partnership Project (3GPP), Mobile Competence Centre ; 650, Route Des Lucioles ; F-06921 Sophia-Antipolis Cedex ; France, no. Seoul, Korea; Mar. 28, 2009, XP050339139, [retrieved on Mar. 28, 2009].
Huawei et al., "CoMP clarification of definitions and TP", R1-083906, 3rd Generation Partnership Project (3GPP), Mobile Competence Centre; 650, Route Des Lucioles; F-06921 Sophia-Antipolis Cedex; France, no. Prague, Czech Republic, Oct. 6, 2008, XP050317271, [retrieved on Oct. 6, 2008].
Intel Corporation (UK) : "Proposal on CoMP evaluation methodology", R1-110250, 3rd Generation Partnership Project (3GPP), Mobile Competence Centre; 650, Route Des Lucioles; F-06921 Sophia-Antipolis Cedex; France, vol. RAN WG1, no. Dublin, Ireland, Jan. 11, 2011, XP050490154, [retrieved on Jan. 11, 2011].
International Search Report and Written Opinion—PCT/US2012/021372-ISAEPO—Apr. 20, 2012.
LG, "LTE Advanced," Nov. 4, 2010, 181 pages.
Motorola Solutions: "Proposals for consideration for CoMP enhancements", 3GPP Draft; R1-110291, 3rd Generation Partnership Project (3GPP), Mobile Competence Centre ; 650, Route Des Lucioles ; F-06921 Sophia-Antipolis Cedex ; France, vol. RAN WG1, no. Dublin, Ireland; Jan. 17, 2011, Jan. 13, 2011, XP050490370, [retrieved on Jan. 13, 2011].
Panasonic: "DM-RS for R-PDCCH and R-PDSCH", R1-094515, 3rd Generation Partnership Project (3GPP), Mobile Competence Centre; 650, Route Des Lucioles; F-06921 Sophia-Antipolis Cedex; France, Jeju, Nov. 9, 2009, XP050388935, [retrieved on Nov. 13, 2009].
Prakash Bhat et al: "LTE-advanced: an operator perspective", IEEE Communications Magazine, IEEE Service Center, Piscataway, US, vol. 50, No. 2, Feb. 1, 2012, pp. 104-114, XP011417046, ISSN:

(56) References Cited

OTHER PUBLICATIONS 0163-6804, DOI: 10.1109/MCOM.2012.6146489 last paragraph of chapter "Features of LTE-AUL MIMO" chapter "CoMP Overview" last thre paragraphs of chapter "CoMP Deployment Considerations"
Samsung: "Remaining Issues on CSI-RS Transmission", 3GPP Draft; R1-105377 Remaining Issues on CSI-RS, 3rd Generation Partnership Project (3GPP), Mobile Competence Centre ; 650, Route Des Lucioles ; F-06921 Sophia-Anti Polis Cedex ; France, vol. RAN WG1, no. Xi'an; Oct. 11, 2010, Oct. 5, 2010, [retrieved on Oct. 5, 2010].
Motorola; "Impact of HeNB interference on paging channel performance", 3GPP Draft; R4-092399, 3rd Generation Partnership Project (3GPP), Mobile Competence Centre; 650, Route Des Lucioles; F-06921 Sophia-Antipolis Cedex ; France, no. Los Angeles, CA; Jun. 25, 2009, XP050353633, [retrieved on Jun. 25, 2009].
NTT DOCOMO: "Throughput Performance Evaluation of RE Muting for Inter-cell CSI-RS," 3GPP Draft; R1-105433 CSIRS PDSCH Muting Evaluation, 3rd Generation Partnership Project (3GPP), Mobile Competence Centre; 650, Route Des Lucioles; F-06921 Sophia-Antipolis Cedex; France, vol. RAN WG1, no. Xian, China; Oct. 11, 2010, Oct. 5, 2010, XP050450566, [retrieved on Oct. 5, 2010] p. 3, paragraph 2.
Pantech: "Considerations on signalling for PDSCH muting in LTE-Advanced", 3GPP Draft; R1-105303, 3rd Generation Partnership Project (3GPP), Mobile Competence Centre; 650, Route Des Lucioles; F-06921 Sophia-Antipolis Cedex, France; vol. RAN WG1, no. Xia an, China; Oct. 2010, Oct. 14, 2010, XP050489302, [retrieved on Oct. 14, 2010] section 2.
ZTE: "Interference coordination for control channels under non-CA based heterogeneous deployments", 3GPP Draft; R1-104566, 3rd Generation Partnership Project (3GPP), Mobile Competence Centre; 650, Route Des Lucioles; F-06921 Sophia-Antipolis Cedex; France; vol. RAN WG1, no. Madrid, Spain; Aug. 23, 2010, Aug. 17, 2010, XP050449863, [retrieved on Aug. 17, 2010] abstract; figure 4 sections 1, 4.
Alcatel-Lucent et al., "Further Details of CoMP Scenarios for Evaluation, Especially Scenario 4", 3GPP TSG RAN WG1 #64, R1-110802, Feb. 15, 2011, pp. 1-8, Retrieved from URL: http://www.3gpp.org/ftp/tsg_ran/WG1_RL1/TSGR1_64/Docs/R1-110802.zip.
CATT: "Considerations on scenarios and simulation assumptions of CoMP," R1-110059, 3GPP, Jan. 17-21, pp. 1-5.
Huawei: CoMP clarification of definitions and TP, 3GPP TSG RAN WG1 Meeting #55, R1-084351, Prague, Czech Republic, Nov. 10-Nov. 14, 2008, pp. 1-5.

Motorola Mobility, "Discussion of RRH Deployment with Single Cell ID", 3GPP TSG-RAN WG1#64 R1-110869, Taiwan, Feb. 21, 2011.
Motorola Mobility: "Overview of Coordinated Multi-Point Operation for LTE", 3GPP TSG RAN1 #63bis, R1-110301, Jan. 2011, pp. 1-3, Retrieved from URL: http://www.3gpp.org/ftp/tsg_ran/WG1_RL1/TSGR1_63b/Docs/R1-110301.zip.
Qualcomm Europe: "Details of CSI-RS", 3GPP TSG-RAN WG1 #59, R1-094867, Nov. 9-13, 2009, Jeju, Korea, pp. 1-6.
Qualcomm Europe: "Impact of Downlink CoMP on the Air Interface" 3GPP Draft; R1-090366, 3rd Generation Partnership Project (3GPP), Mobile Competence Centre ; 650, Route Des Lucioles; F-06921 Sophia-Antipolis Cedex ; France, no. Ljubljana; Jan. 8, 2009, 3 Pages, XP050318270, Jan. 8, 2009.
Qualcomm Incorporated: "Signaling and Configuration of CSI-RS", 3GPP Draft; R1-104797 Signaling and Configuration of CSI-RS, 3rd Generation Partnership Project (3GPP), Mobile Competence Centre ; 650, Route Deslucioles ; F-06921 Sophia-Antipoliscedex; France, vol. RAN WG1, no. Madrid, Spain; Aug. 23, 2010, Aug. 17, 2010, XP050449989,[retrieved on Aug. 17, 2010)sections 4 and 5.
Samsung: "Details of CQI definition for LTE-A", 3GPP Draft; R1-106034, 3rd Generation Partnership Project (3GPP), Mobile Competence Centre ; 650, Route Des Lucioles ; F-06921 Sophia-Antipolis Cedex ; France, vol. RAN WG1, no. Jacksonville, USA; 20101115, Nov. 9, 2010, XP050466815, [retrieved on Nov. 9, 2010]section 1 Introduction section 3 CQI definition for Rel-10 section 7.2.3 Channel quality indicator (CQI) definition.
Samsung: "DL RS Designs for LTE-Advanced," R1-091231, 3GPP, Mar. 23-27, 2009, pp. 1-5.
ZTE: "Enhanced Transmit Diversity Schemes for LTE-A Downlink," R1-091708, 3GPP, May 4-8, 2009, pp. 1-18.
ZTE: "Remaining Issues of CSI Feedback", 3GPP Draft; R1-110174, 3rd Generation Partnership Project (3GPP), Mobile Competence Centre ; 650, Route Des Lucioles ; F-06921 Sophia-antipolis Cedex ; France, vol. RAN WG1, no. Dublin, Ireland; Jan. 17, 2011, Jan. 13, 2011, XP050490359, [retrieved on Jan. 13, 2011].
Translation of First Office Action for Chinese patent application No: 201280013531.3 dated Apr. 28, 2015, 8 pages.
Translation of First Office Action issued for Japanese Application No. 2015-075278 dated Mar. 8, 2016, 5 pages.
Notice of Allowance for Korean Application No. 10-2013-7024045 dated Sep. 25, 2015, 3 pages.
Translation of First Office Action from Counterpart Japanese Application No. 2013-553428, dated Sep. 16, 2014, 5 pages.
Translation of First Office Action from counterpart Japanese Application No. 2013-553446, dated Jul. 1, 2014, 3 pages.
Transaltion of First Office Action from counterpart Japanese Application No. 2013-553457, dated Sep. 2, 2014, 6 pages.

* cited by examiner

COOPERATION AND OPERATION OF MACRO NODE AND REMOTE RADIO HEAD DEPLOYMENTS IN HETEROGENEOUS NETWORKS

CROSS-REFERENCE TO RELATED APPLICATIONS

This application claims the benefit of U.S. Provisional Application Ser. No. 61/442,129, entitled "COOPERATION AND OPERATION OF MACRO AND REMOTE RADIO HEAD DEPLOYMENTS IN HETEROGENEOUS NETWORKS" and filed on Feb. 11, 2011, the benefit of U.S. Provisional Application Ser. No. 61/442,690, entitled "COOPERATION AND OPERATION OF MACRO AND REMOTE RADIO HEAD DEPLOYMENTS IN HETEROGENEOUS NETWORKS" and filed on Feb. 14, 2011, and the benefit of U.S. Provisional Application Ser. No. 61/442,087, entitled "METHOD AND APPARATUS FOR ENABLING CHANNEL AND INTERFERENCE ESTIMATIONS IN MACRO/RRH SYSTEM" and filed on Feb. 11, 2011, which are expressly incorporated by reference herein in their entirety.

BACKGROUND

1. Field

The present disclosure relates generally to communication systems, and more particularly, to a cooperation and operation of macro node and remote radio head (RRH) deployments in heterogeneous networks.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The disclosure provides for the separation of control transmissions and data transmissions within a coverage area of a macro node and geographically displaced remote radio heads (RRHs) coupled to the macro node. The macro node together with the RRHs may be considered a plurality of transmission/reception points (TxPs) or points. By separating control and data in the macro node/RRH configuration, user equipments (UEs) may be associated with at least one transmission point for data transmission while control information is transmitted based on common reference signals (CRS) from a different set of transmission points. This enables cell splitting for data transmissions across different transmission points while possibly leaving control transmissions common for all transmission points. Separating control and data may allow for faster reconfiguration of antenna ports used for UE data transmission compared with reconfiguration via a handover process. The separation of control transmissions and data transmissions within the coverage of the macro node/RRH configuration may be enabled by UE-specific reference signals.

In an aspect of the disclosure, a method, an apparatus, and a computer program product for wireless communication are provided. The apparatus may include a macro node and at least one remote radio head (RRH) coupled to the macro node, the macro node and the at least one RRH comprising a plurality of points that are geographically displaced. The apparatus transmits control information with common reference signals (CRS) to a user equipment (UE) from a first subset of points, and sends a data transmission based on UE-specific demodulation reference signals (DM-RS) to the UE from a second subset of points.

Another aspect relates to the apparatus transmitting control information with common reference signals (CRS) to a user equipment (UE) from a subset of points, receiving a sounding reference signal (SRS) from the UE at one or more points of the plurality of points, determining channel strengths to each of the one or more points from the UE based on the SRS received by the one or more points, determining whether the UE is in close proximity to at least one point of the one or more points based on the determined channel strengths, and sending a data transmission based on CRS to the UE from the at least one point when the UE is determined to be in close proximity to the at least one point based on the determined channel strengths, wherein the data transmission based on CRS is sent to the UE from the at least one point independent of data transmissions from points not in close proximity to the UE.

A further aspect relates to an apparatus communicating with a macro node and at least one remote radio head (RRH) coupled to the macro node, the macro node and the at least one one RRH comprising a plurality of points that are geographically displaced. The apparatus is configured for receiving control information with common reference signals (CRS) from a first subset of points, receiving data transmitted based on demodulation reference signals (DM-RS) from a second subset of points, receiving channel state information reference signals (CSI-RS) from the second subset of points, and transmitting a channel state information report based at least in part on the received CSI-RS, the channel state information report comprising at least one of precoding matrix indicator (PMI), rank index (RI), or channel quality indicator (CQI) feedback.

DETAILED DESCRIPTION

Figure 1:
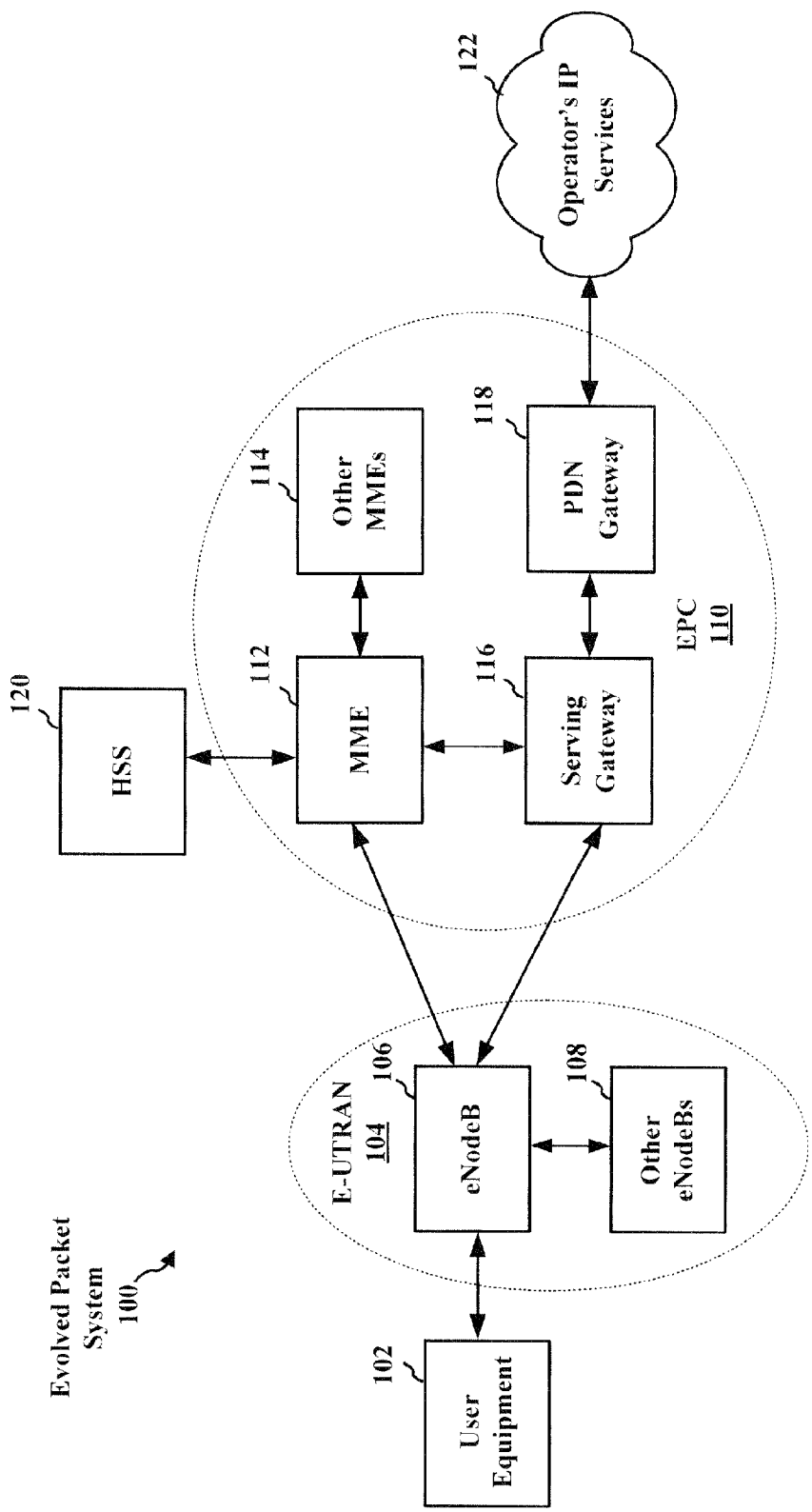
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
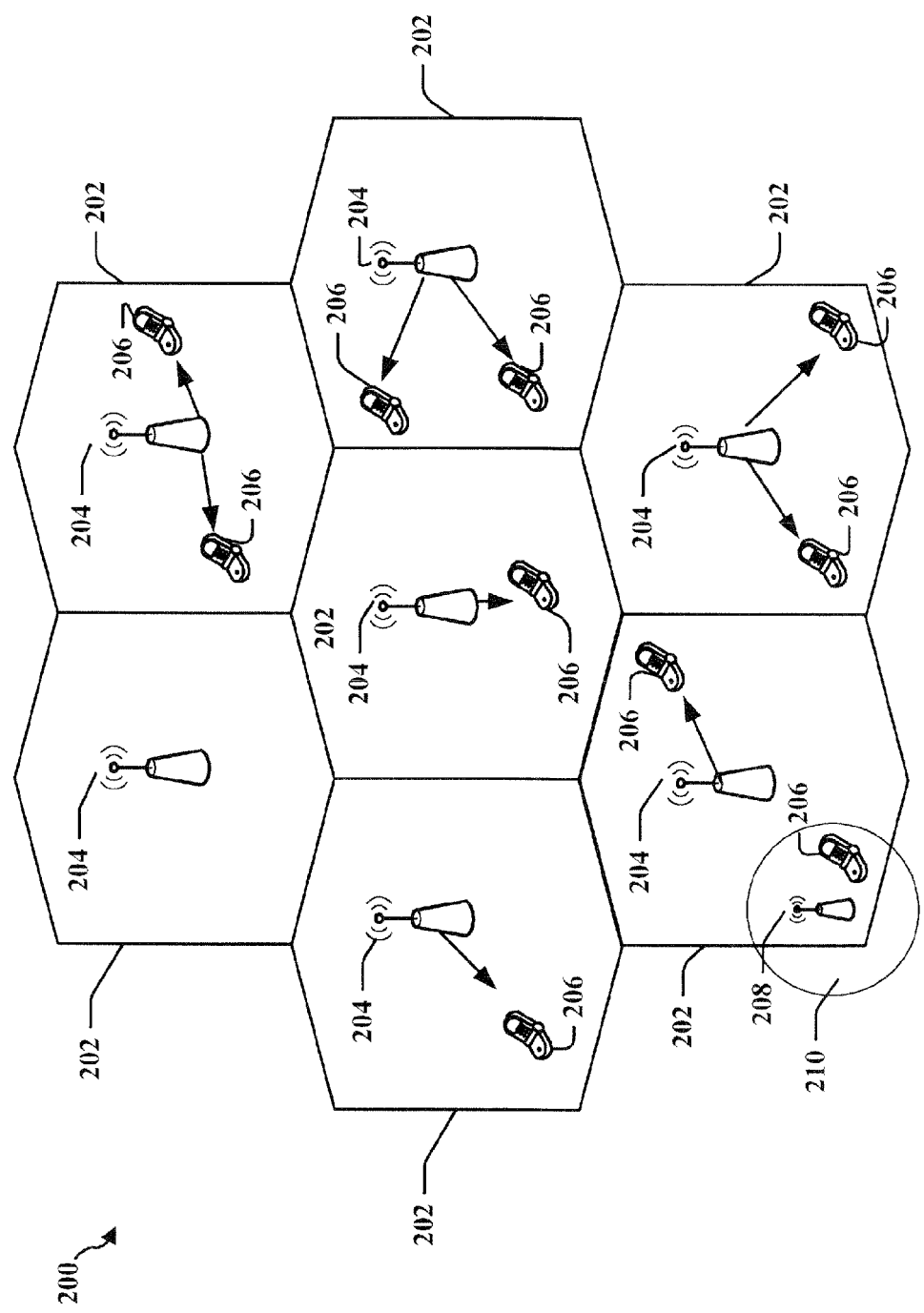
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be, for example, a remote radio head (RRH). Alternatively, the lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
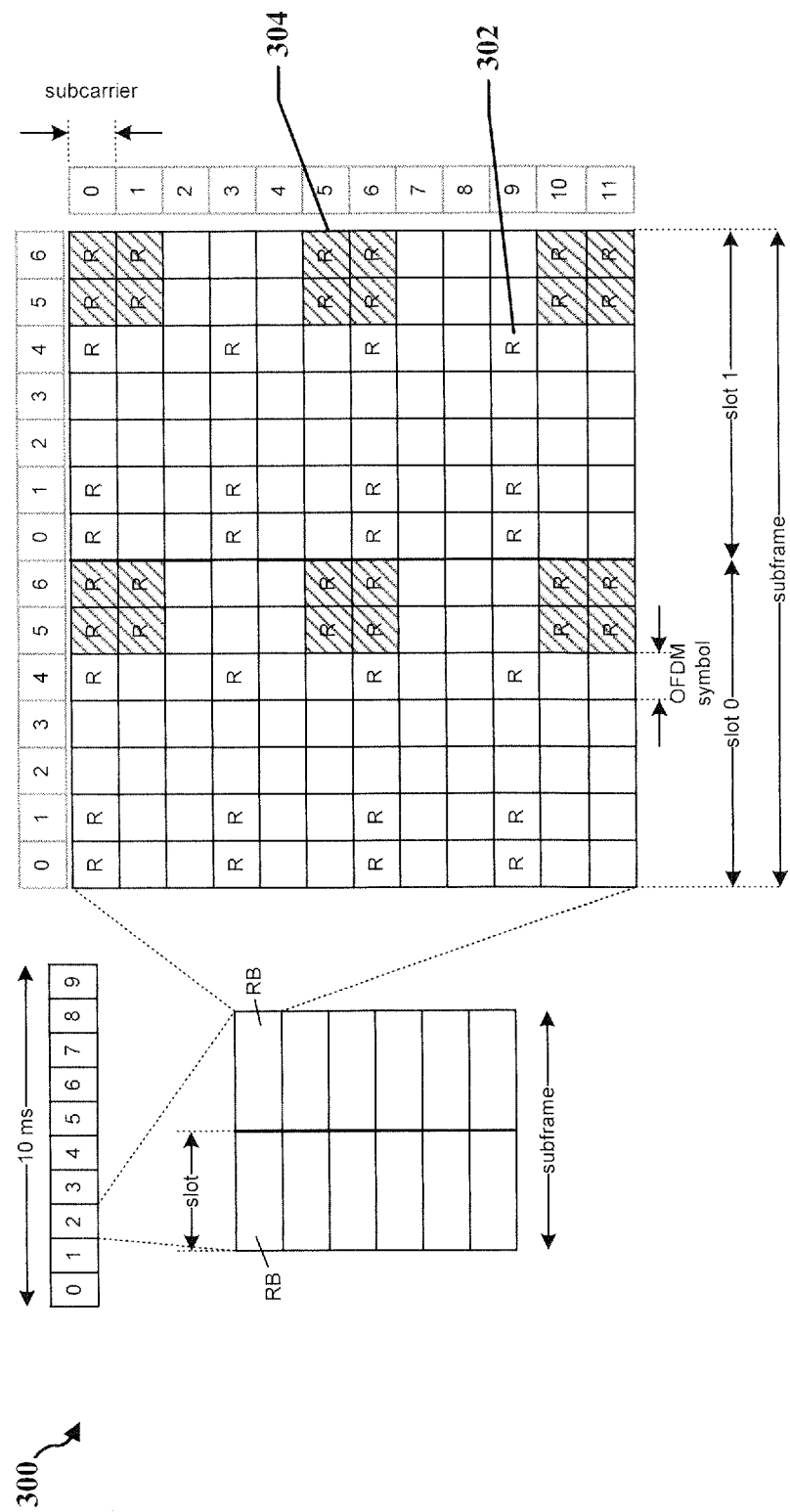
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
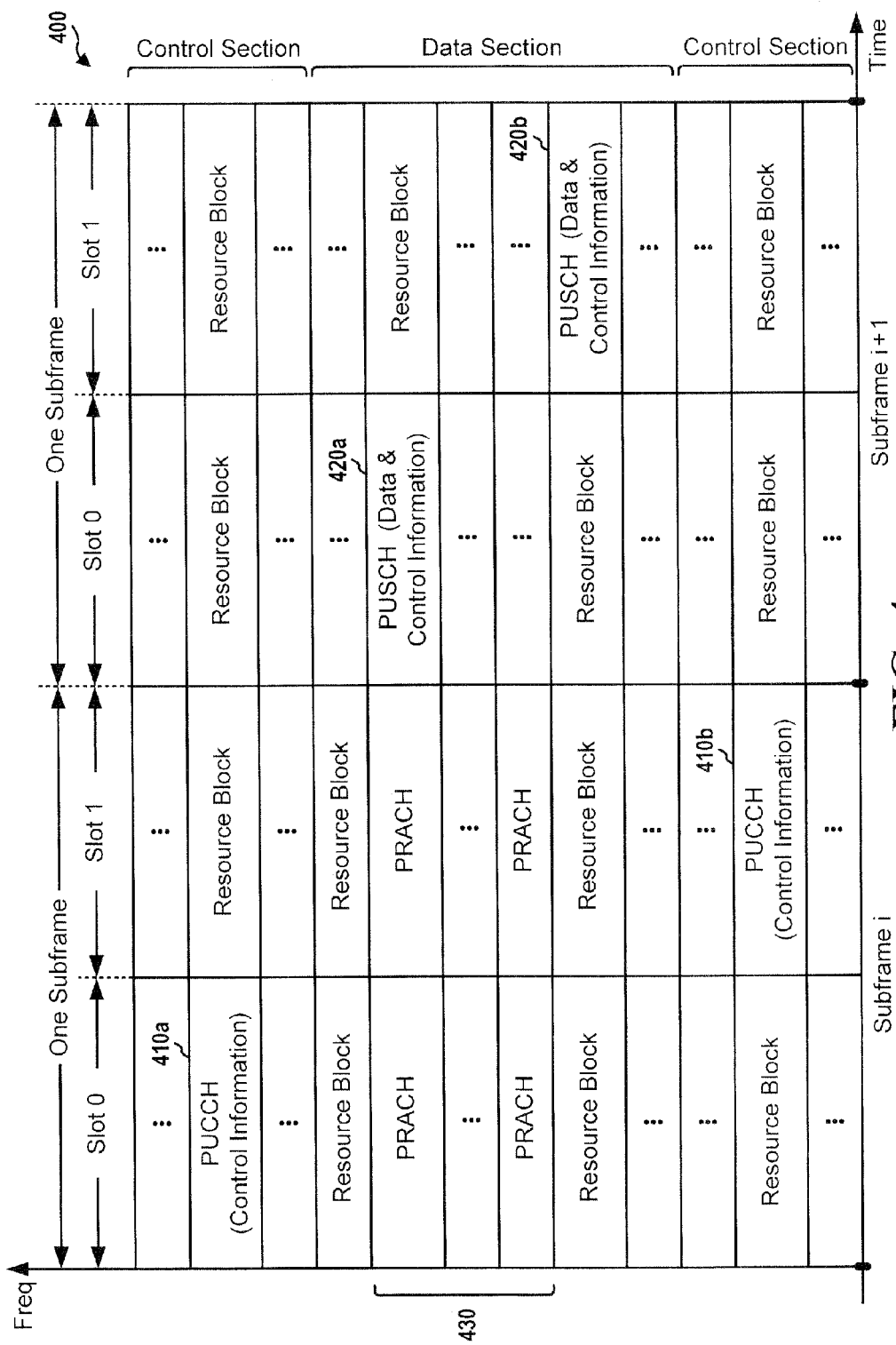
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
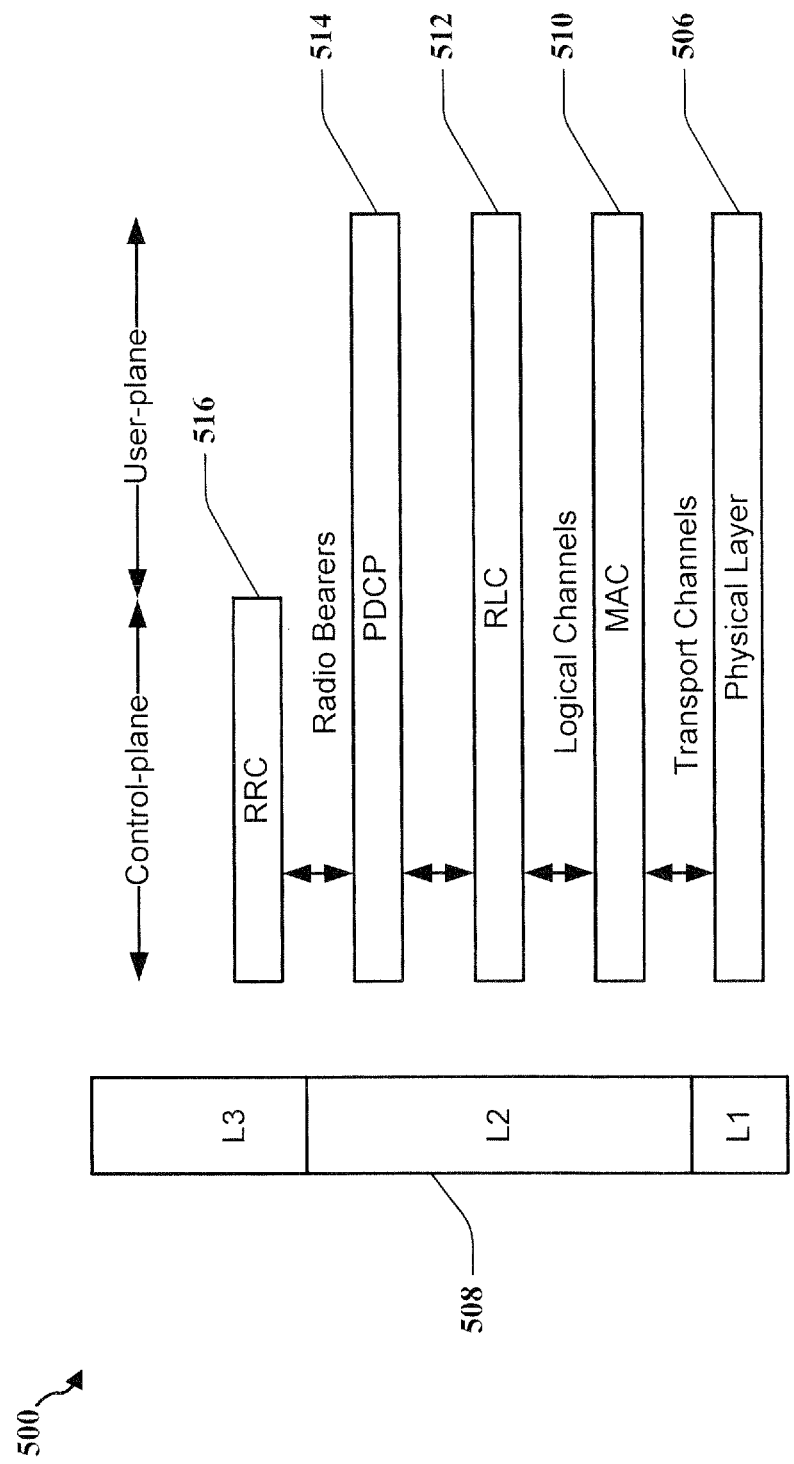
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
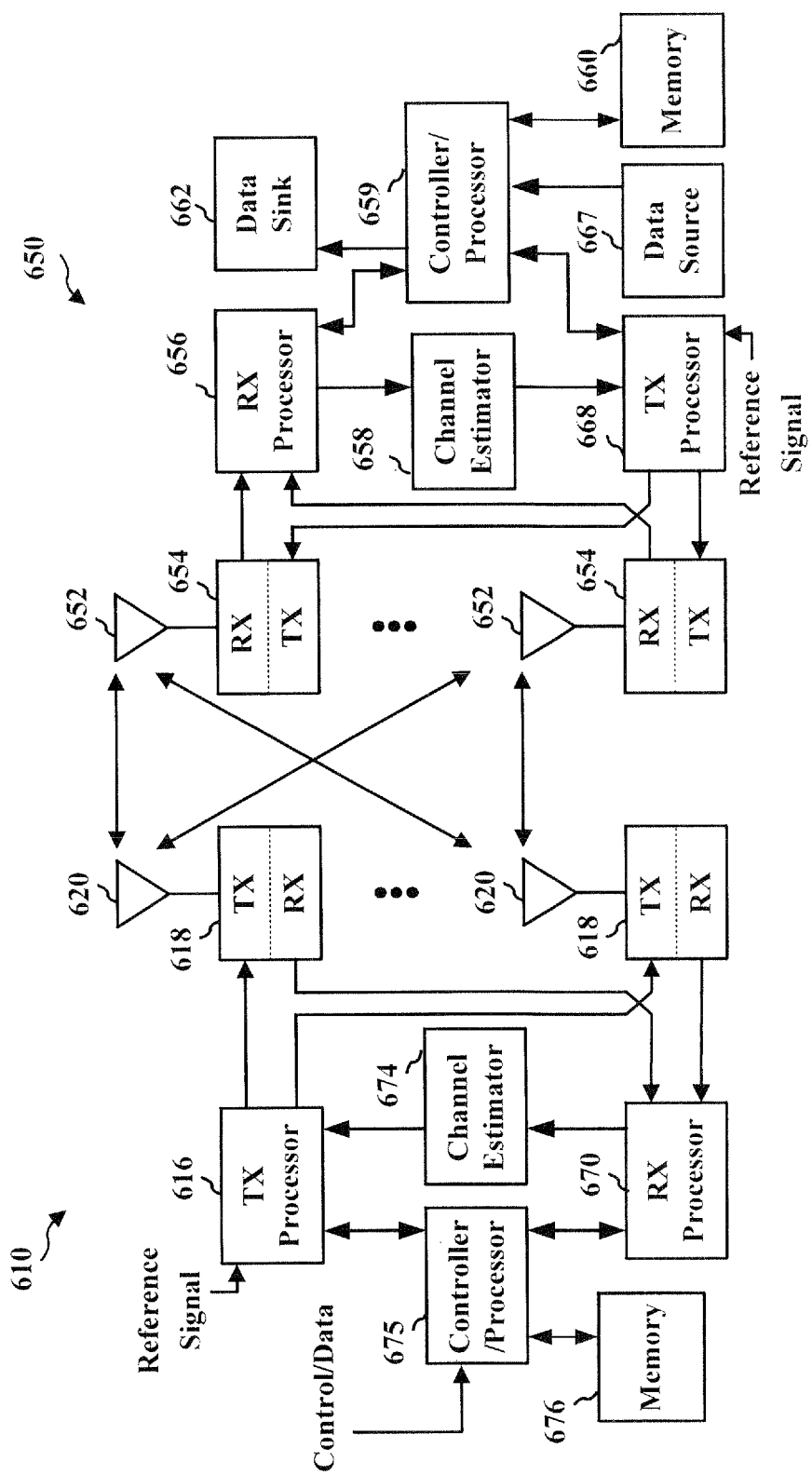
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
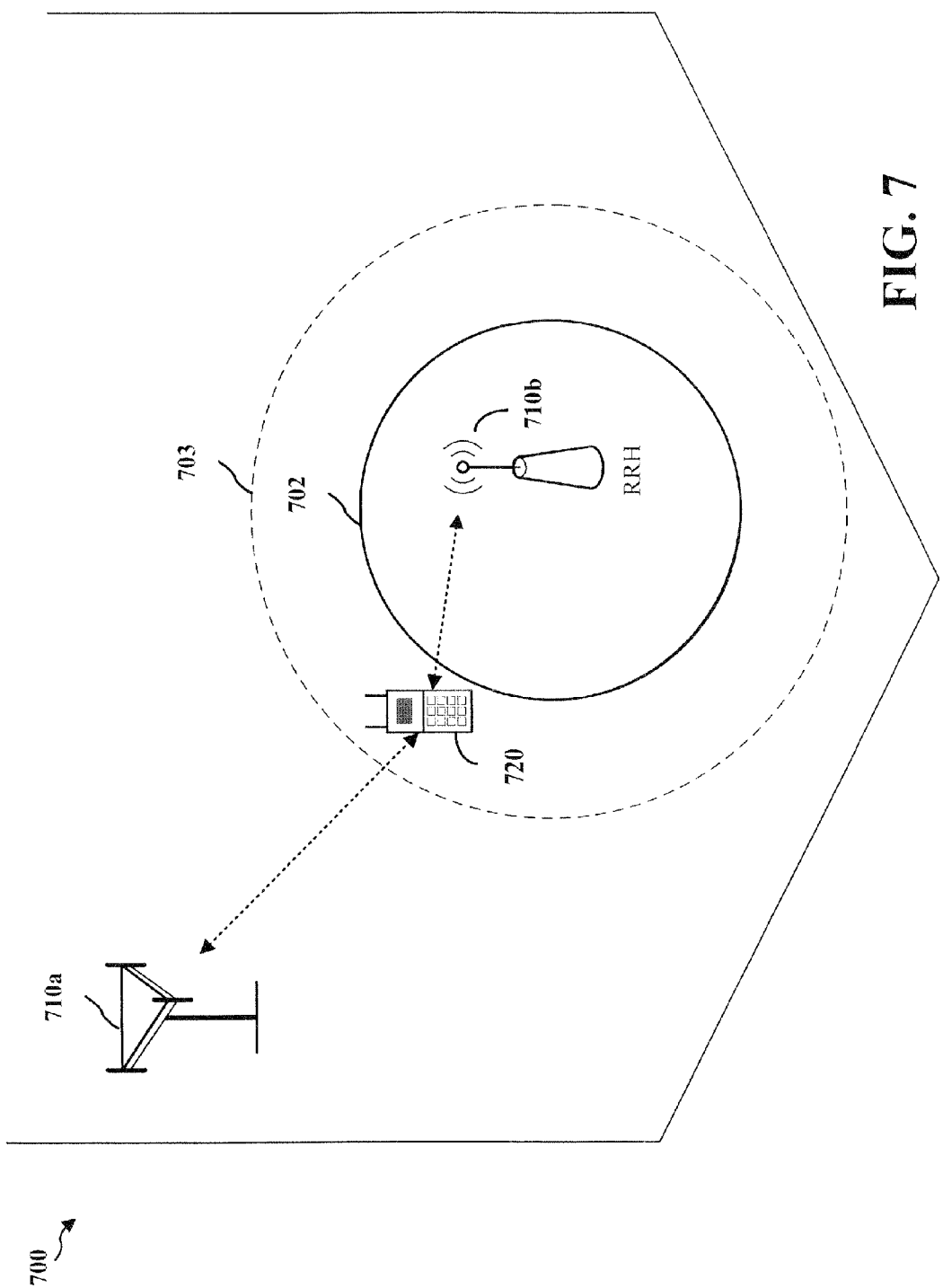
FIG. 7 is a diagram illustrating a cellular range expansion (CRE) region in a heterogeneous network.

FIG. 7 is a diagram 700 illustrating a cellular range expansion (CRE) region in a heterogeneous network. A heterogeneous network may include a macro node interconnected with a plurality of low power pico nodes operating within the same cell region. The macro node may be interconnected with the plurality of pico nodes by an X2 backhaul or an optical fiber backhaul. When the macro node is interconnected to the plurality of pico nodes via the X2 backhaul, the macro node does not handle scheduling for the pico nodes. Rather, the low power pico nodes independently schedule themselves, as scheduling is performed at each cell. Moreover, the macro node and pico nodes are all configured with different cell identifiers (IDs). The heterogeneous network interconnected via the X2 backhaul may use enhanced inter-cell interference coordination (eICIC) over the backhaul, or other forms of eICIC, or some form of coordinated multipoint transmission/reception (CoMP), including but not limited to coordinated beamforming, joint transmission, or distributed antenna selection.

A lower power class eNB such as the RRH 710*b* may have a range expanded cellular region 703 that is expanded from the cellular region 702 through enhanced inter-cell interference coordination between the RRH 710*b* and the macro eNB 710*a* and through interference cancellation performed by the UE 720. In enhanced inter-cell interference coordination, the RRH 710*b* receives information from the macro eNB 710*a* regarding an interference condition of the UE 720. The information allows the RRH 710*b* to serve the UE 720 in the range expanded cellular region 703 and to accept a handoff of the UE 720 from the macro eNB 710*a* as the UE 720 enters the range expanded cellular region 703.

Figure 8:
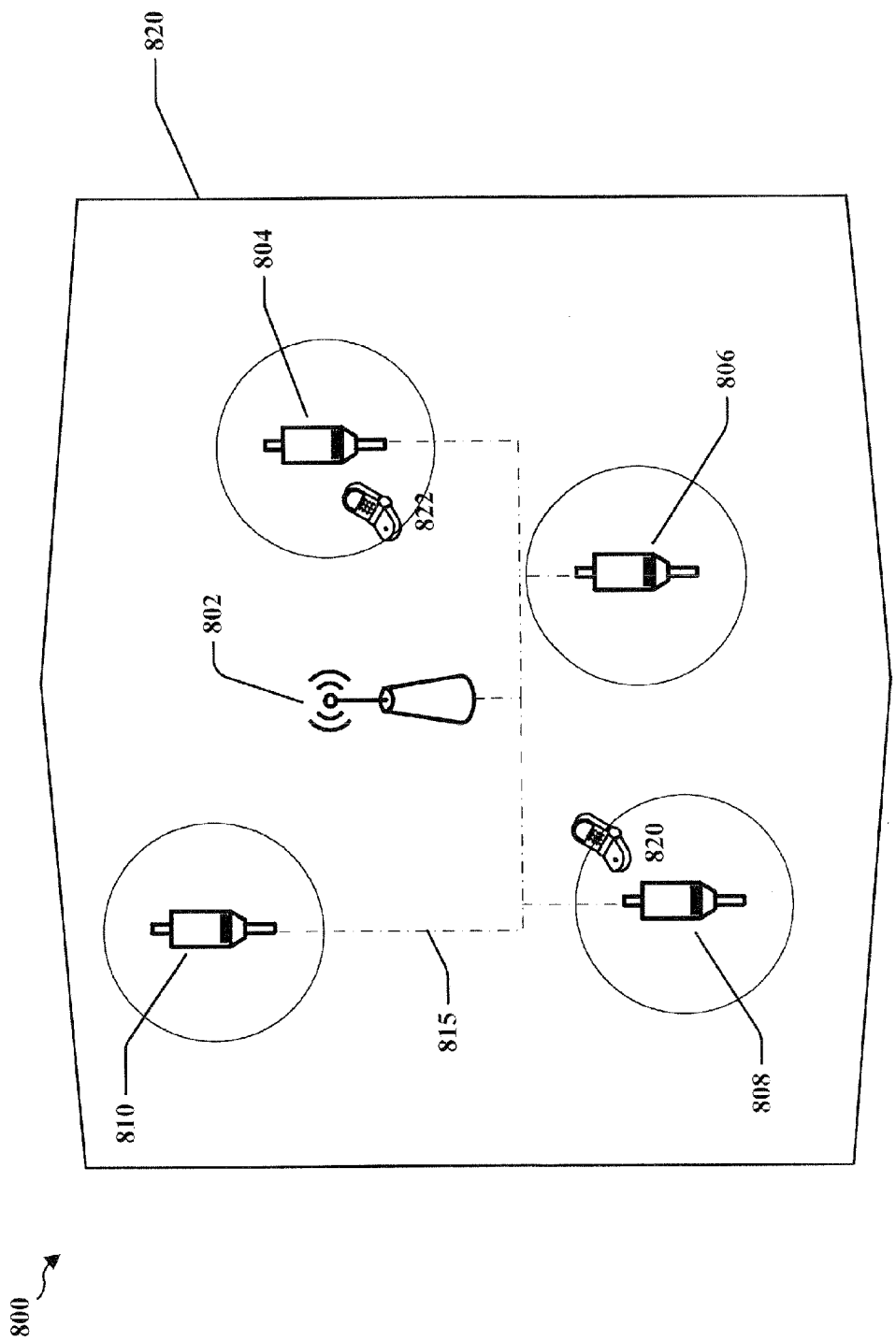
FIG. 8 is a diagram illustrating a heterogeneous network with low power RRHs operating within the same cell region.

FIG. 8 is a diagram 800 illustrating a heterogeneous network with low power RRHs operating within the same cell region 820. In FIG. 8, the low power RRHs 804, 806, 808, 810 are interconnected with a macro node 802 by an optical fiber 815. Alternatively, the macro node 802 may be a pico node. In general, heterogeneous network setups may provide the most performance benefit to advanced UEs (e.g., UEs for LTE Rel-10 or later) when the UEs receive a data transmission from the RRHs or nodes. A key difference between heterogeneous network setups is related to control signaling and handling of legacy impact (e.g., impact on UEs prior to LTE Rel-10).

In an aspect, the macro node 802 handles all scheduling within the cell, for itself and the RRHs 804, 806, 808, 810. The RRHs 804, 806, 808, 810 may be configured with the same cell identifier (ID) as the macro node 802. If the RRHs 804, 806, 808, 810 are configured with the same cell ID as the macro node 802, the macro node 802 and the RRHs 804, 806, 808, 810 essentially operate as one cell controlled by the macro node 802.

The deployment of the macro node 802 and RRHs 804, 806, 808, 810 in FIG. 8 may be viewed as a distributed antenna array setup. Concentrated processing at the macro node 802 may provide performance benefits. Furthermore, if the RRHs 804, 806, 808, 810 are configured with the same cell ID as the macro node 802, a single CRS may be used, e.g., the same pilot/RS is transmitted from the macro node 802 and each RRH.

In another aspect, the RRHs 804, 806, 808, 810 may be configured with a cell identifier (ID) different from the macro node 802. Moreover, each of the RRHs 804, 806, 808, 810 may be configured with a different cell ID, respectively. If the macro node 802 and the RRHs 804, 806, 808, 810 are configured with different cell IDs, the macro node 802 and the RRHs 804, 806, 808, 810 operate to appear as different cells to a UE, although all control and scheduling may still be handled by the macro node 802. Furthermore, if the macro node 802 and the RRHs 804, 806, 808, 810 are configured with different cell IDs, different CRS may be used, e.g., different pilots/RS are transmitted from the macro node 802 and each RRH.

Referring to FIG. 8, the heterogeneous network interconnected via the optical fiber backhaul may use enhanced inter-cell interference coordination (eICIC) over the backhaul, or other forms of eICIC, or some form of coordinated multipoint transmission/reception (CoMP), including but not limited to coordinated beamforming, joint transmission, or distributed antenna selection. Furthermore, the network of FIG. 8 interconnected via the optical fiber backhaul may be considered a heterogeneous network with a perfect backhaul. Perfect backhaul typically refers to an idealized backhaul link that offers sufficiently low latency and sufficiently high capacity to support the aforementioned operation. CoMP refers to a wide range of different techniques that enable dynamic coordination of transmission and/or reception with multiple geographically separated eNBs or points with the aim to enhance overall system performance, utilize resources more effectively, and improve end-user service quality. Accordingly, when a UE is at a cell-edge region, the UE may be able to receive signals from multiple points regardless of a system load. With respect to downlink transmissions, if the signaling transmitted from the multiple points is coordinated, then downlink performance may be significantly increased. For example, the coordination may focus on interference avoidance or scheduling transmissions of the same data from the multiple eNBs. With respect to uplink, a UE signal can be received by the multiple eNBs. Therefore, if scheduling is coordinated from the multiple eNBs, the multiple reception can be taken advantage of to significantly improve link performance.

Figure 9:
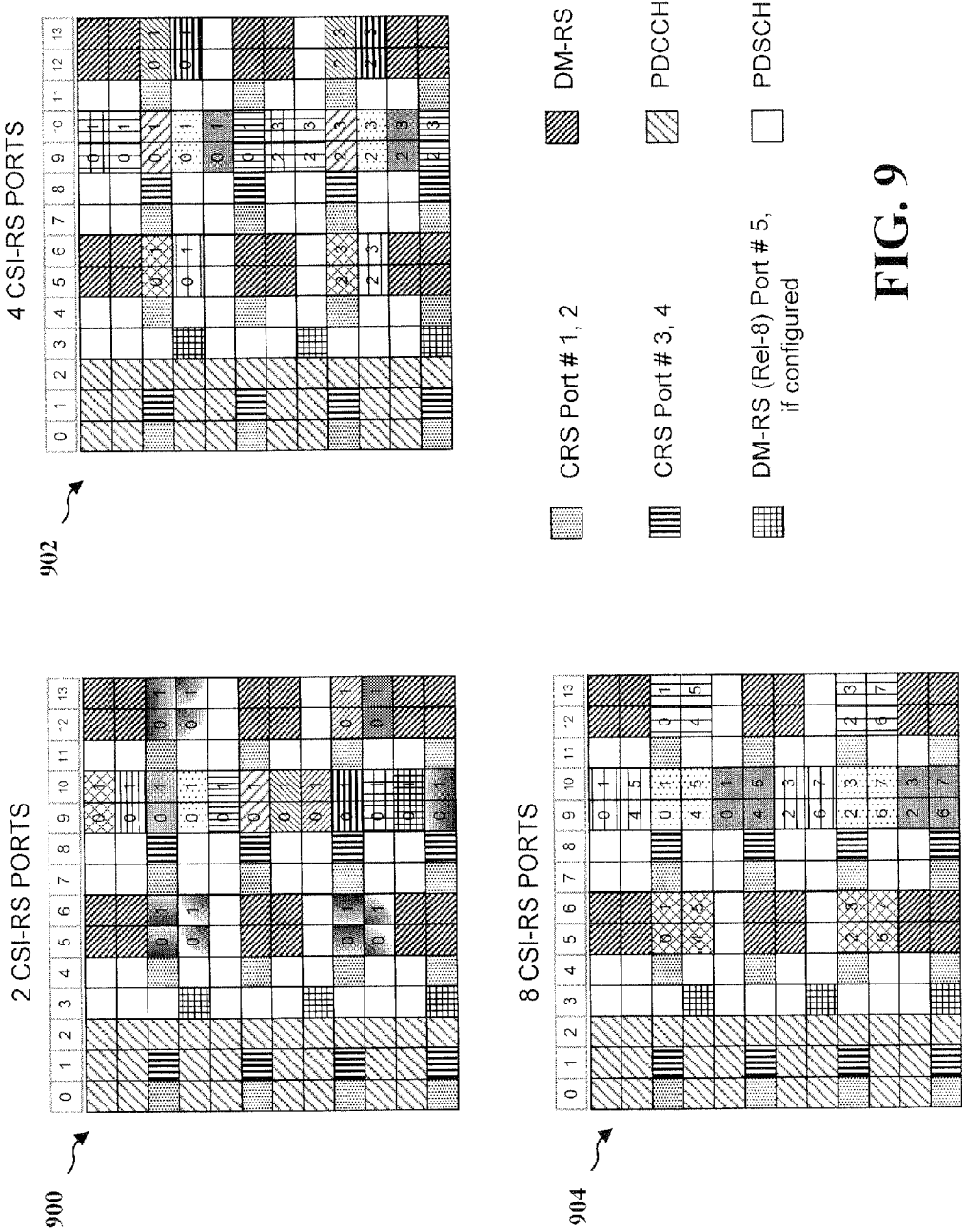
FIG. 9 illustrates diagrams of reference signal configurations within a set of resource blocks.

FIG. 9 illustrates diagrams 900, 902, and 904 of reference signal configurations within a set of resource blocks. The set of resource blocks may include common or cell-specific reference signals (CRS) for ports 1, 2, 3, and 4, demodulation reference signals (DM-RS), and channel state information reference signals (CSI-RS). Diagram 900 shows a configuration for 2 CSI-RS, diagram 902 shows a configuration for 4 CSI-RS, and diagram 904 shows a configuration for 8 CSI-RS. A physical downlink control channel (PDCCH) and the PDSCH are also shown.

Referring to FIGS. 8 and 9, each of the RRHs may be assigned to transmit on one or more CSI-RS resources. In general, the macro node and RRHs may be assigned a subset of a certain CSI-RS resource. For example, for an 8-port CSI-RS resource, RRH 1304 may be assigned to transmit on CSI-RS ports 0, 1, RRH 806 may be assigned to transmit on CSI-RS ports 2, 3, RRH 808 may be assigned to transmit on CSI-RS ports 4, 5, and RRH 810 may be assigned to transmit on CSI-RS ports 6, 7. The macro node and/or RRHs may be assigned the same CSI-RS resources. For example, RRH 804 and RRH 808 may be assigned to transmit on CSI-RS ports 0, 1, 2, 3, and RRH 806 and RRH 810 may be assigned to transmit on CSI-RS ports 4, 5, 6, 7. In such a configuration, the CSI-RS from RRHs 804, 808 would overlap and the CSI-RS from RRHs 806, 810 would overlap.

The configuration of CSI-RS resources is UE-specific. Each UE can be configured with a set of CSI-RS resources and each resource may include a predetermined number of CSI-RS ports (e.g., 1, 2, 4, or 8 CSI-RS ports). Each UE may receive CSI-RS from one or more of the RRHs 804, 806, 808, 810. For example, the UE 822 may receive CSI-RS on CSI-RS ports 0, 1 from RRH 804, CSI-RS on CSI-RS ports 2, 3 from RRH 806, CSI-RS on CSI-RS ports 4, 5 from RRH 808, and CSI-RS on CSI-RS ports 6, 7 from RRH 810. Such a configuration is specific to the UE 822, as the UE 820 may receive CSI-RS on different ports from the same RRHs.

In another example, the UE 820 may also be configured with 8 CSI-RS ports and receive CSI-RS on CSI-RS ports 0, 1 from RRH 808, CSI-RS on CSI-RS ports 2, 3 from RRH 810, CSI-RS on CSI-RS ports 4, 5 from RRH 804, and CSI-RS on CSI-RS ports 6, 7 from RRH 806. Generally, for any particular UE, the CSI-RS ports may be distributed among the RRHs, and the particular UE can be configured to receive CSI-RS on those ports, from RRHs configured to send information on those ports to the particular UE.

When each of the RRHs share the same cell ID with the macro node 802, control information may be transmitted with CRS from the macro node or both the macro node 802 and all of the RRHs. The CRS may be transmitted from all of the points (i.e., macro node, RRHs) using the same resource elements, resulting in the transmitted signals being on top of each other. Moreover, when all of the points have the same cell ID, the UE may not be able to differentiate between the CRSs transmitted from each of the points.

When the RRHs have different cell IDs, the CRS transmitted from each of the RRHs may collide. When CRS collision occurs, the CRS from different cells may be transmitted using the same resource elements. Furthermore, when the RRHs have different cell IDs and the CRS collide, the CRS transmitted from each of the points can be differentiated by interference cancellation techniques and/or advanced receiver processing.

Referring to FIG. 8, when CRS is transmitted from multiple points, proper antenna virtualization may be needed if there are an unequal number of physical antennas at the macro node 802 and the RRHs 804, 806, 808, 810. That is, CRS should be transmitted from an equal number of (virtual) transmit antennas at each macro node and RRH. For example, if the macro node 802 and the RRHs 804, 806, 808 each have four physical antennas and the RRH 810 has two physical antennas, a first antenna of the RRH 810 may be configured to transmit using two CRS ports and a second antenna of the RRH 810 may be configured to transmit using a different two CRS ports. The number of antenna ports can be increased or decreased in relation to the number of physical antennas.

As discussed supra, the macro node 802 and the RRHs 804, 806, 808, 810 may all transmit CRS. However, if only the macro node 802 transmits CRS, a transmission/reception outage can occur close to an RRH not transmitting CRS due to automatic gain control (AGC) issues.

A difference between heterogeneous network setups using a same cell ID versus different cell IDs for the RRHs is mainly related to control signaling, CRS-based transmission modes, and other potential operations relying on CRS. The heterogeneous network setup with the different cell IDs and colliding CRS may be advantageous compared to the heterogeneous network setup with the same cell ID because system characteristics/components which depend on the cell ID (e.g., scrambling sequences, etc.) can be more easily differentiated.

When the macro node and the RRHs are configured with the same cell ID and some UEs are configured to operate based on CRS-based transmission modes, time division multiplexing (TDM) partitioning with one region of a single frequency network (SFN) and one region of pico cell splitting for high geometry legacy UEs may be used. This may enable a basic form of "cell" splitting for UEs located in close proximity to a specific point. In the aforementioned setup, for UEs configured with transmission modes that rely on UE-specific reference signals for demodulation, the data transmission may be based on UE-specific DM-RS.

When the network is configured with different cell IDs, a heterogeneous network design may be used. That is, eICIC techniques, including but not limited to the techniques specified as part of LTE Rel-10, may be employed. It is further possible to configure UEs to operate with transmission modes that rely on UE-specific DM-RS, similar to the aforementioned same cell ID configuration.

To resolve any issues with respect to radio resource management (RRM)/radio link management (RLM), when the network is configured with different cell IDs, for LTE Rel-8/9, the UE may attach to a strongest cell, which is similar to a heterogeneous network design with colliding CRS. For LTE Rel-10 and later, existing procedures may work if interference cancellation (IC) or advanced receiver processing is available. Hence, there may be no need for sounding reference signals (SRS)-based association to points. The control signals and data signals may also be decoupled.

When the network is configured with the same cell ID, CRS transmission from the points transmitting CRS combine, which may be transparent to UEs. The UEs may be configured to transmit sounding reference signals (SRS) to determine the proximity of the UEs to certain points. It may also be possible to use reference signals other than the CRS for RRM/LLM procedures, e.g., the CSI-RS may be used for such purposes.

With respect to feedback/codebook consideration, UEs may perform channel state information reporting based at least in part on the CSI-RS and provide CSI feedback for a network configured with the same cell ID. However, an issue arises because existing codebooks were designed assuming that a path loss for each of the CSI-RS is equal, and may therefore suffer some performance loss if this condition is not satisfied. Since multiple RRHs may comprise a single CSI-RS resource from a UE's perspective, the path loss associated with each of the CSI-RS ports may be different. As such, codebook refinements may be needed to enable efficient cross-point CSI feedback that takes into account the proper path losses to points. Multiple CSI feedback may be provided by grouping antenna ports and providing feedback per group.

For CRS-based CSI feedback, the network configured with the same cell ID sees a composite channel. Therefore, some degradation may occur as existing codebooks were not devised to account for such a setup. For CSI-RS based CSI feedback, CSI-RS is used for channel feedback. Some performance difference between same cell ID/different cell ID setups may result if interference estimation is based on CRS. Performing both channel and interference measurement based on CSI-RS may also be possible.

Further considering feedback/codebooks, when the network is configured with different cell IDs, precoding matrix indicator (PMI)/rank index (RI) feedback characteristics may differ. For example, PMI/RI feedback may be provided for a strongest cell based on CRS. Alternatively, PMI/RI feedback may be based on CSI-RS for a certain transmission mode. Notably, the CSI-RS configuration is UE specific, so the UE can associate freely with RRHs as desired. Codebooks may also be enhanced to provide for inter-cell PMI/RI feedback, etc.

When the network is configured with the same cell ID, PMI/RI feedback characteristics may also differ. For example, PMI/RI feedback may be provided assuming transmission from all points using CRS. PMI/RI feedback may also be based on CSI-RS for a certain transmission mode. Because the CSI-RS configuration is UE specific, the UE can associate freely with RRHs or have a cross-point assignment. However, the existing codebooks may not be designed for cross-point assignment of CSI-RS ports.

With respect to channel quality indicator (CQI) feedback, when the network is configured with different cell IDs, CQI/RI feedback characteristics may differ. For example, CQI/RI feedback may be the same as in a heterogeneous network design with colliding CRS.

When the network is configured with the same cell ID, CQI/RI feedback characteristics may also differ. For example, CQI/RI feedback may depend on CRS configuration (e.g., whether all points transmit CRS or only the macro node transmits CRS). If all points transmit CRS, then CQI/RI feedback may be the same as in a single SFN case. Channel estimation may be based on CSI-RS, and interference estimation may be performed using CSI-RS. Therefore, CQI/RI feedback may be based on CSI-RS.

In an aspect, the term transmission/reception point ("TxP") or point represents geographically separated transmission/reception nodes which are being controlled by at least one central entity (e.g., eNB) and may have the same cell ID or different cell IDs. The exemplary configurations are applicable to macro node/RRH configurations with the same cell ID or different cell IDs. In the case of different cell IDs, CRS transmissions may be configured to overlap, which leads to a similar scenario as the same cell ID case. However, the case of different cell IDs may be advantageous as system characteristics which depend on the cell ID (e.g., scrambling sequences, etc.) may be more easily differentiated by the UE.

An exemplary macro node/RRH entity provides for separation of control transmissions and data transmissions within the coverage of a macro node/RRH configuration. Referring to an aspect of FIG. 8, when the cell ID is the same for each TxP, the PDCCH may be transmitted with CRS from the macro node 802 or both the macro node 802 and the RRHs 804, 806, 808, 810, while the PDSCH may be transmitted with CSI-RS and DM-RS from a subset of the TxPs. Referring to another aspect of FIG. 8, when the cell ID is different for some of the TxPs, PDCCH may be transmitted with CRS in each cell ID group. The CRS transmitted from each cell ID group may or may not collide. UEs cannot differentiate CRS transmitted from multiple TxPs with the same cell ID, but can differentiate CRS transmitted from multiple TxPs with different cell IDs (e.g., using interference cancellation or similar techniques).

The separation of control transmissions and data transmissions within the coverage of a macro node/RRH configuration provides for a UE-transparent way of "associating" UEs with at least one point for data transmission while transmitting control based on CRS transmissions from all the points. This enables cell splitting for a data transmission across different points while leaving the control channel common. The term "associating" above refers to configuring antenna ports for a specific UE for a data transmission. This is different from an association that would be performed in the context of handover. Control information may be transmitted based on CRS as discussed supra. Separating control and data may allow for a faster reconfiguration of the antenna ports that are used for a UE's data transmission compared with reconfiguration via a handover process. Cross-point feedback may be possible by configuring a UE's antenna ports to correspond to the physical antennas of different points.

The separation of control transmissions and data transmissions within the coverage of a macro node/RRH configuration is enabled by UE-specific reference signals. CSI-RS and DM-RS are the reference signals used in the LTE-A context. Interference estimation may be performed based on CSI-RS muting. Because control transmissions are common, control capacity issues may exist because PDCCH capacity may be limited. Accordingly, control capacity may be enlarged by using a frequency division multiplexed (FDM) control channel. Moreover, a relay PDCCH (R-PDCCH) or extensions thereof may be used to supplement, augment, or replace the PDCCH control channel.

The UE provides CSI feedback based at least in part on its CSI-RS configuration to provide PMI/RI/CQI. Typical codebook design assumes that antennas are not geographically separated, and therefore, the same path loss exists from the antenna array to the UE. However, this is not the case for multiple RRHs, as the antennas are uncorrelated and see different channels. Therefore, codebooks may be refined to enable more efficient cross-point CSI feedback. For example, CSI estimation may capture the path loss difference between antenna ports associated with different points. Furthermore, multiple feedback may be provided by grouping antenna ports and provide feedback per group.

With respect to CRS-based transmission modes as well as PDCCH control channels (e.g., considering legacy UE operation), in case of same cell ID operation, the macro node and RRHs transmit the same data and the same control information at the same time. In case different cell IDs are used for RRHs, some cell splitting is possible for CRS-based data and/or control transmissions. UE-RS of releases prior to LTE Rel-10 may be used for demodulation and enables some cell splitting. As CSI-RS may not be available for some UEs (e.g., UEs of releases prior to Rel-10), CSI feedback could be based on reciprocity-based feedback. For example, the eNB can determine the channel conditions based on sounding reference signals (SRS) transmitted from the UEs.

It should be noted that the network setup with the same cell IDs may benefit mobility procedures due to the combining of CRS transmissions. This may result in a decreased number of handovers.

In the case of a macro node/RRH configuration with different cell IDs, separation of control transmissions and data transmissions is possible similar to the case of a macro node/RRH configuration with the same cell ID (as mentioned supra). While a UE may receive control information from the strongest cell, or possibly a certain set of strong cells/transmission points, data transmissions may be performed from a different set of cells or transmission points. In one example, this may avoid the need to decode control information from the set of cells/transmission points that are performing data transmission, which may possibly have a weaker signal for their control transmissions.

In the case of the macro node/RRH configuration with different cell IDs, control information may therefore be received from the strongest cell, or possibly from a set of cells with a strong signal. Therefore, UEs located in close proximity to one or multiple RRHs may be able to receive control information from those transmission points directly. This may have advantages in terms of control capacity compared to the scenario in which all nodes share the same cell ID.

In another aspect, relating to the macro node/RRH configuration with different cell IDs, a UE in the coverage area of a stronger cell on downlink, which may possibly include one or more transmission points that share the same cell ID, may receive data from a different set of transmission points. Thus, the data sent from these transmissions points may need to appear as data sent from the stronger cell. For UE-RS/DM-RS based transmissions, the sequences may be scrambled for this purpose. On uplink, the UE may use the scrambling sequence assigned by the stronger cell. Moreover, the uplink control may be received by the transmission points that are transmitting data as they are likely closer to the UE.

In another aspect, again primarily relating to the macro node/RRH configuration with different cell IDs, a cell may transmit multiple CSI-RS for the same antenna on different locations corresponding to different cell IDs. This will allow a neighboring eNB to advertise the CSI-RS of this cell as the CSI-RS of the neighboring eNB. This may be useful, for example, for Rel-10 UEs that connect to the macro node for control information but need a feedback channel as measured from the CSI-RS of a pico node/RRH with a different cell ID. The pico node/RRH may transmit CSI-RS using a scrambling sequence corresponding to a macro cell ID in addition to its own CSI-RS using scrambling based on its own cell ID.

In another aspect, it may be beneficial to increase the number of UE-RS/DM-RS scrambling sequences for a given cell ID to make pilots independent when multiple RRHs sharing the same cell ID transmit data using UE-RS at the same time. The scrambling sequences for UE-RS/DM-RS should be assigned such that the same sequence is most likely used by RRHs that are far away from each other. More generally, the scrambling sequences used can be planned across the cell and RRHs to reduce the impact of SFN having the same pilot scrambling.

In another aspect, an RRH at the cell edge may perform range expansion/data transmissions for more than one cell. This is straightforward when neighboring cells have colliding CRS. For example, if the RRH does not transmit CRS, the RRH could rate match on some resources corresponding to the CRS location of one eNB for one set of UEs (e.g., UEs connected to the first cell) while rate matching based on the CRS location of the second eNB on other resources or for other UEs, etc. Alternatively, the RRH could transmit CRS corresponding to one cell ID but transmit data to UEs of a second cell on MBSFN subframes of the cell using the first cell ID.

In a further aspect, with respect to a UE-specific configuration of CSI-RS ports, the CSI-RS patterns agreed to in LTE Rel-10 may be exploited to improve the CSI estimation accuracy for UEs by assigning CSI-RS patterns judiciously throughout the macro node/RRH configuration. It should be appreciated that this is possible for both the macro node/RRH configuration with the same cell ID and macro node/RRH configuration with different cell IDs.

Figure 10:
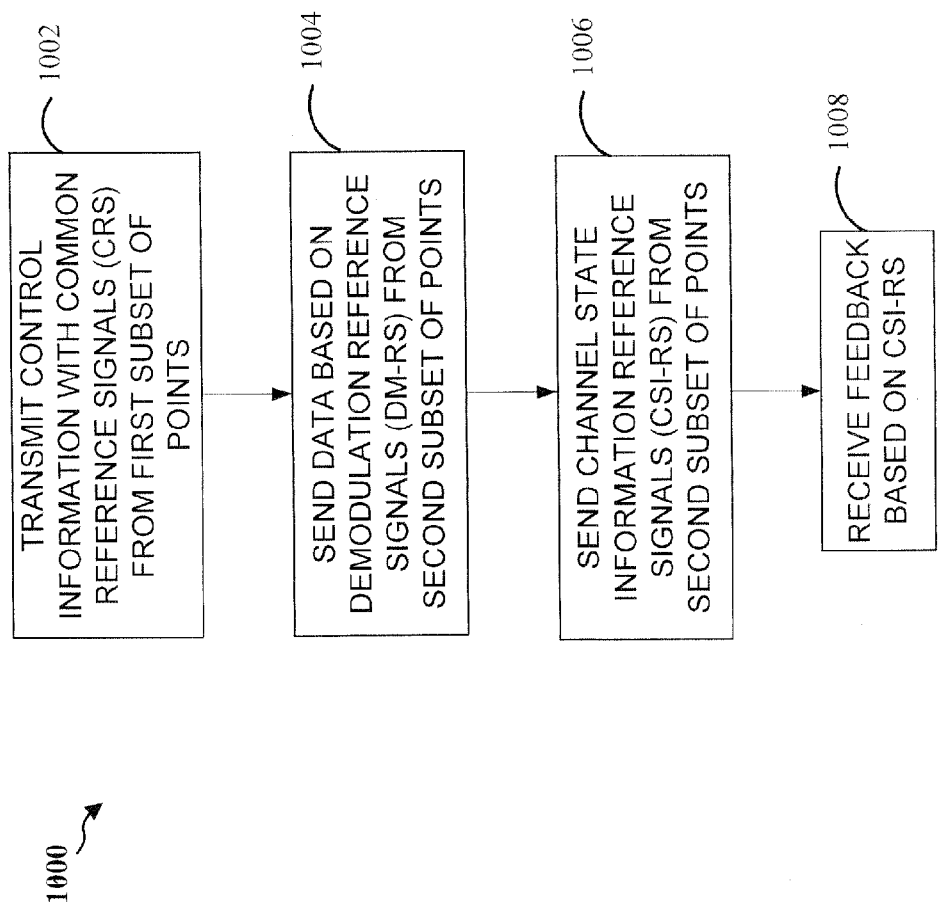
FIG. 10 is a flow chart of a method of wireless communication.

FIG. 10 is a flow chart 1000 of a method of wireless communication. The method allows for the separation of control transmissions and data transmissions within the coverage area of a macro node and a plurality of geographically displaced remote radio heads (RRHs) coupled to the macro node. The macro node together with the RRHs may be considered a plurality of transmission/reception points (TxPs) or points. Accordingly, the separation of control transmissions and data transmissions allows for association of a UE with at least one TxP for data transmission while control information is transmitted based on CRS transmissions from a potentially different set of TxPs or even all the TxPs. This enables cell splitting for data transmissions across different TxPs while potentially leaving control transmissions common to all TxPs. The method may be performed by an eNB.

At step 1002, control information is transmitted with common reference signals (CRS) to a UE from a first subset of points. CRS may be transmitted in every downlink subframe and in every resource block in the frequency domain, thus covering an entire cell bandwidth. The UE may use the CRS for channel estimation for coherent demodulation of a downlink physical channel except for a physical multicast channel (PMCH) and for PDSCH in the case of transmission modes 7, 8, or 9. The UE may also use the CRS to acquire channel state information (CSI). Also, UE measurements on CRS may be used as the basis for cell selection and handover decisions.

At step 1004, data is sent to the UE based on UE-specific reference signals (e.g., demodulation reference signals (DM-RS)) from a second subset of points. The DM-RS are intended to be used by the UE for PDSCH channel estimation in transmission modes 7, 8, or 9. These reference signals are "UE-specific" as they are intended to be used for channel estimation by a designated UE or specific designated subset of UEs. Thus, a UE-specific reference signal is only transmitted within resource blocks assigned for PDSCH transmission to the designated UE(s).

Referring to FIG. 10, the first subset of points may have the same cell identifier, and therefore, each may transmit the same control information and CRS. Alternatively, a designated point in the plurality of points may have a different cell identifier from any other point in the plurality of point. Accordingly, in an aspect, second control information and a second CRS may be transmitted from the designated point, wherein the designated point is not in the first subset of points.

Still referring to FIG. 10, the control information may be transmitted using a frequency division multiplexed (FDM) control channel or a relay channel. The relay channel may be a relay physical downlink control channel (R-PDCCH). Furthermore, the first subset of points may include the macro node and zero or more RRHs, while the second subset of points may include the macro node and/or one or more RRHs.

At step 1006, channel state information reference signals (CSI-RS) are sent to the UE from the second subset of points. CSI-RS is specifically intended to be used by the UE to acquire CSI in the case when demodulation reference signals (DM-RS) are used for channel estimation. For example, CSI-RS is used in the case of transmission mode 9. CSI-RS have a significantly lower time/frequency density, thus implying less overhead, compared to CRS.

At step, 1008, feedback based at least in part on the CSI-RS is received from the UE. The received feedback may be a channel state information report comprising at least one of precoding matrix indicator (PMI), rank index (RI), or channel quality indicator (CQI) feedback. Moreover, the received PMI, RI, or CQI feedback may be based on channel conditions from the second subset of points to the UE and interference conditions at the UE.

Figure 11:
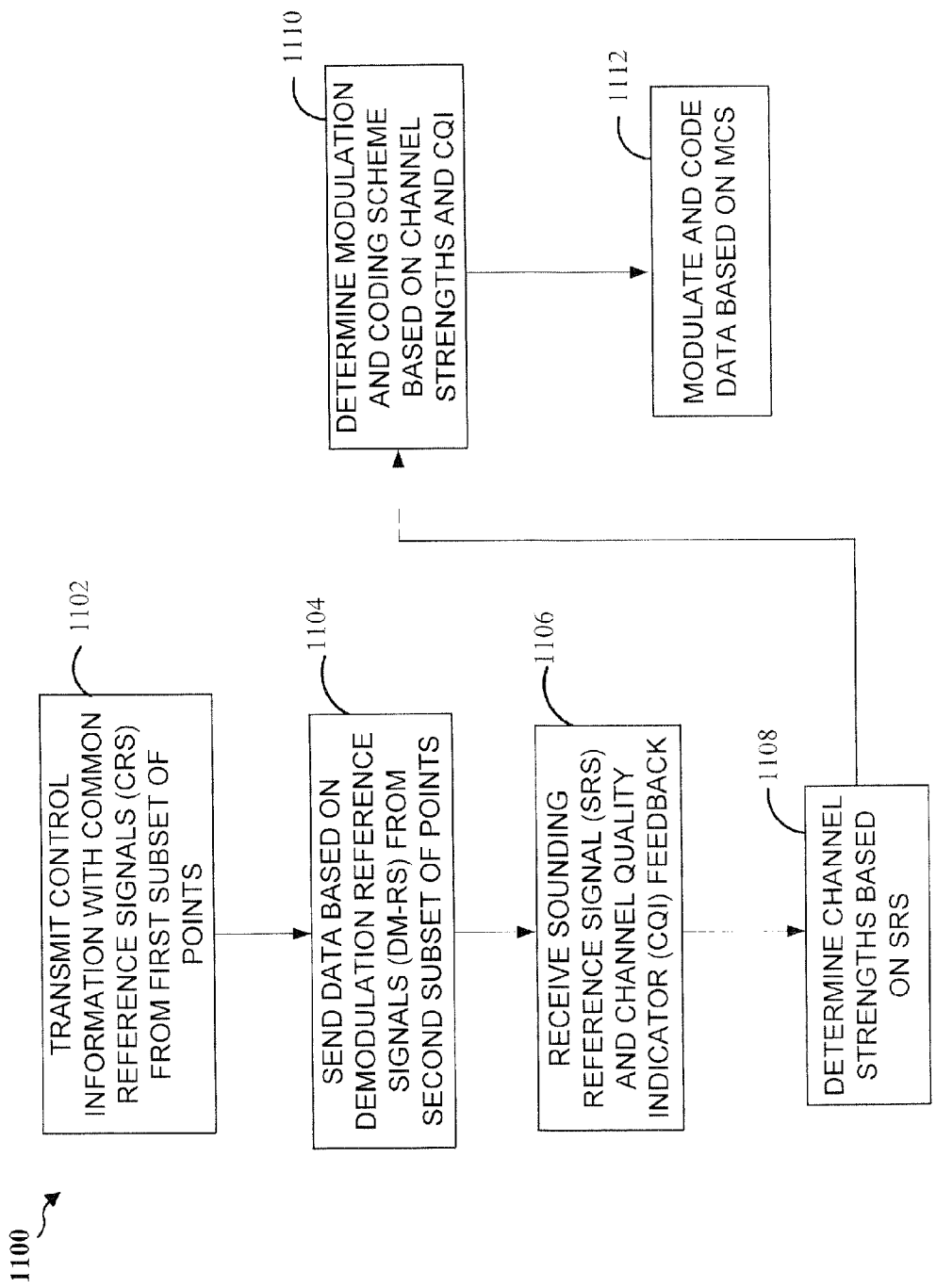
FIG. 11 is a flow chart of a method of wireless communication.

FIG. 11 is a flow chart 1100 of a method of wireless communication. The method allows for the separation of control transmissions and data transmissions within the coverage area of a macro node and a plurality of geographically displaced remote radio heads (RRHs) coupled to the macro node, similar to the method of FIG. 10 described above. The macro node together with the RRHs may be considered a plurality of transmission/reception points (TxPs) or points. The method of FIG. 11 also allows for reciprocity-based feedback, wherein the UE provides channel state information to the macro node/RRHs in the absence of CSI-RS from the RRHs. The method may be performed by an eNB.

At step 1102, control information is transmitted with common reference signals (CRS) to a UE from a first subset of points. As discussed supra, the UE may use CRS for channel estimation for coherent demodulation of a downlink physical channel except for a physical multicast channel (PMCH) and for PDSCH in the case of transmission modes 7, 8, or 9. The UE may also use the CRS to acquire channel state information (CSI). Also, UE measurements on CRS may be used as the basis for cell selection and handover decisions.

At step 1104, data is sent to the UE based on UE-specific reference signals (e.g. demodulation reference signals (DM-RS)) from a second subset of points. The UE-specific reference signals are "UE-specific" and are intended to be used for channel estimation by a designated UE or specific designated subset of UEs. Thus, a UE-specific reference signal is only transmitted within resource blocks assigned for PDSCH transmission to the designated UE(s).

At step 1106, a sounding reference signal (SRS) is received from the UE at one or more points of the plurality of points. SRS may be transmitted on the uplink to allow the eNB to estimate the uplink channel state at different frequencies. The channel-state estimates can then, for example, be used by a network scheduler to assign resource blocks for uplink PUSCH transmission (uplink channel-dependent scheduling), as well as to select different transmission parameters such as an instantaneous data rate and different parameters related to uplink multi-antenna transmission. SRS may also be used for uplink timing estimation and to estimate downlink channel conditions assuming downlink/uplink channel reciprocity. Also at step 1106, channel quality indicator (CQI) feedback may be received from the UE.

At step 1108, the eNB may determine channel strengths based on the received SRS. Channel strength may depend on a distance between a sender and receiver. Therefore, the eNB may determine channel strengths at each of the one or more points from the UE based on the SRS received by the one or more points.

At step 1110, the eNB determines a modulation and coding scheme (MCS) for a future data transmission to the UE. The MCS is determined based on the determined channel strengths and the received CQI from the UE. Thereafter, at step 1112, the eNB modulates and codes the data for transmission to the UE based on the determined MCS.

Figure 12:
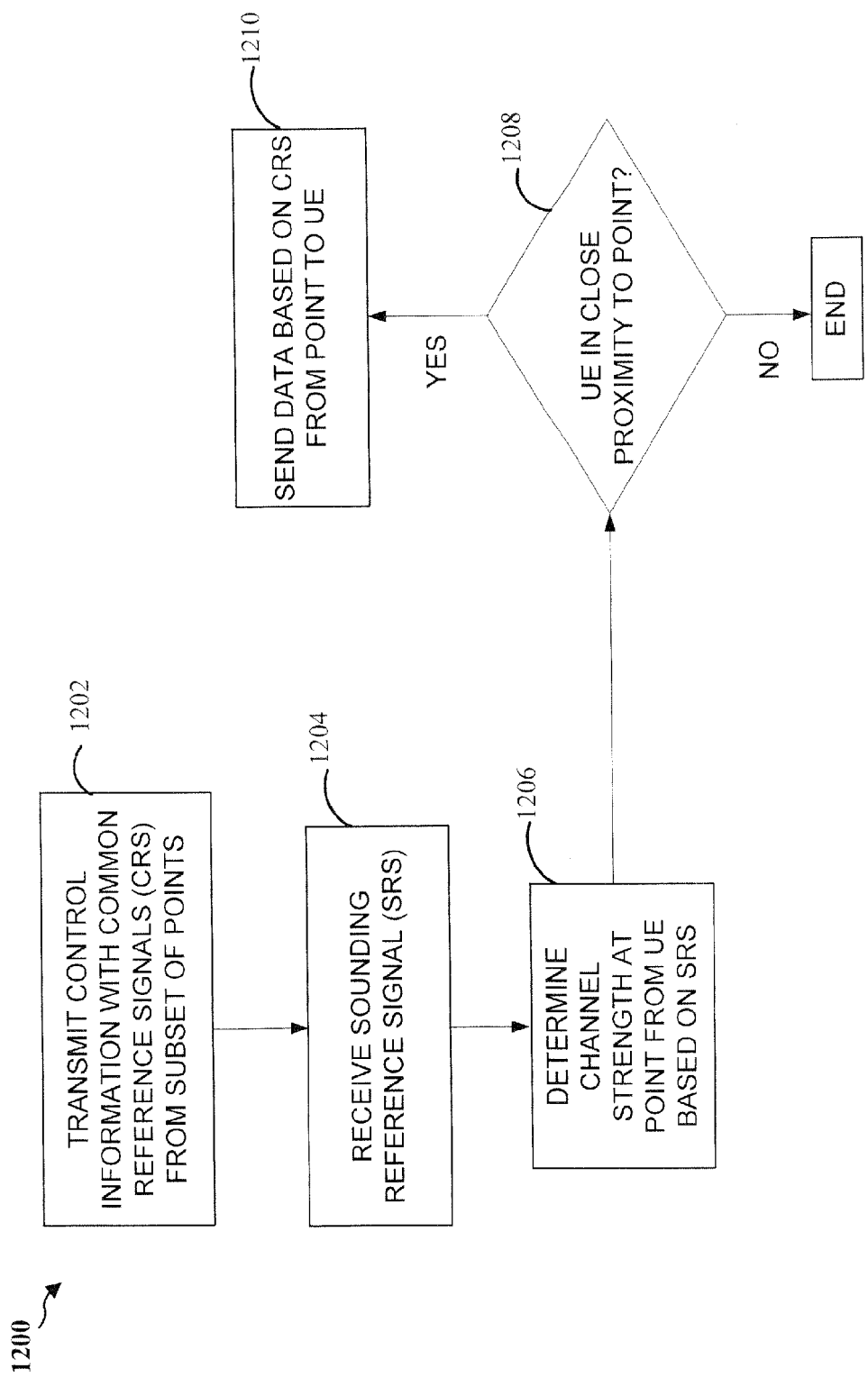
FIG. 12 is a flow chart of a method of wireless communication.

FIG. 12 is a flow chart 1200 of a method of wireless communication. The method allows for the separation of control transmissions and data transmissions within the coverage area of a macro node and a plurality of geographically displaced remote radio heads (RRHs) coupled to the macro node, similar to the method of FIG. 10 described above. The macro node together with the RRHs may be considered a plurality of transmission/reception points (TxPs) or points. The method of FIG. 12 also allows for a UE in close proximity to a point, to receive data based on CRS from that point without use of UE-specific reference signals. The method may be performed by an eNB.

At step 1202, control information is transmitted with common reference signals (CRS) to a UE from a subset of points. As discussed supra, the UE may use the CRS for channel estimation for coherent demodulation of a downlink physical channel except for a physical multicast channel (PMCH) and for PDSCH in the case of transmission modes 7, 8, or 9. The UE may also use the CRS to acquire channel state information (CSI). Also, UE measurements on CRS may be used as the basis for cell selection and handover decisions.

At step 1204, a sounding reference signal (SRS) is received from the UE at one or more points of the plurality of points. SRS may be transmitted on the uplink to allow the eNB to estimate the uplink channel state at different frequencies. The channel-state estimates can then, for example, be used by a network scheduler to assign resource blocks for uplink PUSCH transmission (uplink channel-dependent scheduling), as well as to select different transmission parameters such as an instantaneous data rate and different parameters related to uplink multi-antenna transmission. SRS may also be used for uplink timing estimation and to estimate downlink channel conditions assuming downlink/uplink channel reciprocity.

At step 1206, the eNB may determine channel strengths based on the received SRS. Channel strength may depend on a distance between a sender and receiver. Therefore, the eNB may determine channel strengths at each of the one or more points from the UE based on the SRS received by the one or more points.

At step 1208, the eNB determines whether the UE is in close proximity to at least one point of the one or more points based on the determined channel strengths. If so, the eNB may save resources and operate more efficiently by sending data to the UE from the at least one point in close proximity to the UE.

At step 1210, based on the result of step 1208, the eNB proceeds to send data to the UE based on CRS from the at least one point in close proximity to the UE. Here, in contrast with the methods of FIGS. 10 and 11, the data is sent to the UE based on reference signals that are not UE-specific. That is, the reference signals are not intended for channel estimation by a designated UE or specific designated subset of UEs. Moreover, the data transmission based on CRS is sent to the UE from the at least one point independent of data transmissions from points not in close proximity to the UE. Accordingly, cell splitting may be accomplished without use of UE-specific reference signals.

Figure 13:
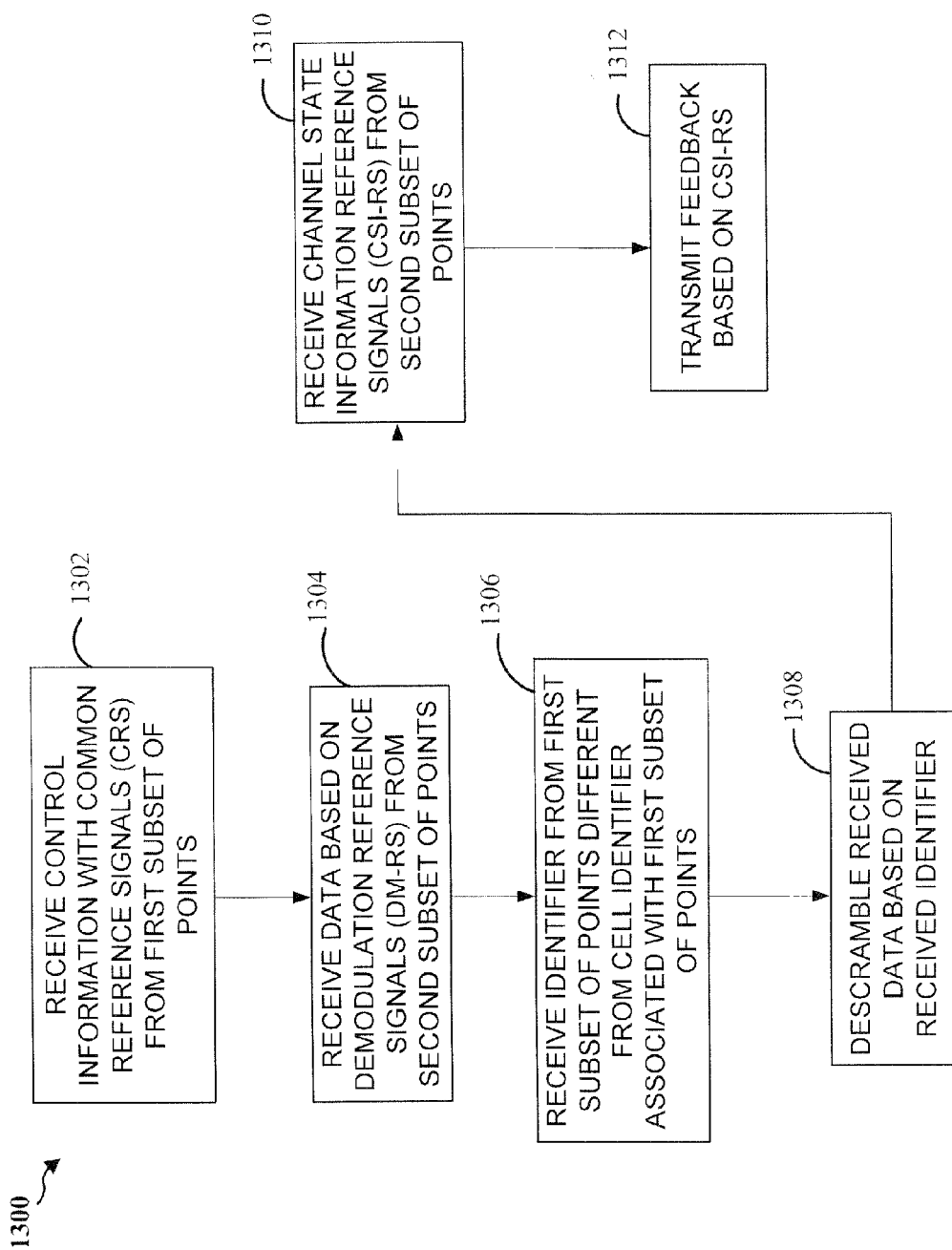
FIG. 13 is a flow chart of a method of wireless communication.

FIG. 13 is a flow chart 1300 of a method of wireless communication. The method allows for the separation of control transmissions and data transmissions within the coverage area of a macro node and a plurality of geographically displaced remote radio heads (RRHs) coupled to the macro node. The macro node together with the RRHs may be considered a plurality of transmission/reception points (TxPs) or points. Accordingly, the separation of control transmissions and data transmissions allows for association of a UE with at least one TxP for data transmission while control information is transmitted based on CRS transmissions from a potentially different set of TxPs or even all the TxPs. This enables cell splitting for data transmissions across different TxPs while potentially leaving control transmissions common to all TxPs. The method may be performed by a UE.

At step 1302, the UE receives control information with common reference signals (CRS) from a first subset of points. The first subset of points may include the macro node and zero or more RRHs. As discussed supra, the UE may use the CRS for channel estimation for coherent demodulation of a downlink physical channel except for a physical multicast channel (PMCH) and for PDSCH in the case of transmission modes 7, 8, or 9. The UE may also use the CRS to acquire channel state information (CSI). Also, UE measurements on CRS may be used as the basis for cell selection and handover decisions.

At step 1304, the UE receives data based on UE-specific reference signals (e.g., demodulation reference signals (DM-RS)) from a second subset of points. The second subset of points may include one or more RRHs. The DM-RS are specifically intended to be used by the UE for channel estimation for PDSCH in transmission modes 7, 8, or 9. These reference signals are "UE-specific" as they are intended to be used for channel estimation by a designated UE or specific designated subset of UEs. Thus, a UE-specific reference signal is only transmitted within resource blocks assigned for PDSCH transmission to the designated UE(s).

At step 1306, the UE may receive an identifier from the first subset of points. Here, the plurality of points may be configured with different cell identifiers. Thus, the received identifier may be different from a cell identifier associated with the first subset of points. Accordingly, the UE may utilize knowledge of the different identifier to decode data received from a point. Hence, at step 1308, the UE descrambles the received data from the second subset of points based on the identifier received from the first subset of points.

At step 1310, the UE receives channel state information reference signals (CSI-RS) from the second subset of points. As discussed supra, CSI-RS is specifically intended to be used by the UE to acquire CSI in the case when demodulation reference signals (DM-RS) are used for channel estimation. For example, CSI-RS is used in the case of transmission mode 9. CSI-RS have a significantly lower time/frequency density, thus implying less overhead, compared to CRS.

At step, 1312, the UE transmits feedback based at least in part on the received CSI-RS. The transmitted feedback may be a channel state information report including at least one of precoding matrix indicator (PMI), rank index (RI), or channel quality indicator (CQI) feedback. Moreover, the transmitted PMI, RI, or CQI feedback may be based on channel/interference conditions from the second subset of points to the UE and interference conditions at the UE.

Figure 14:
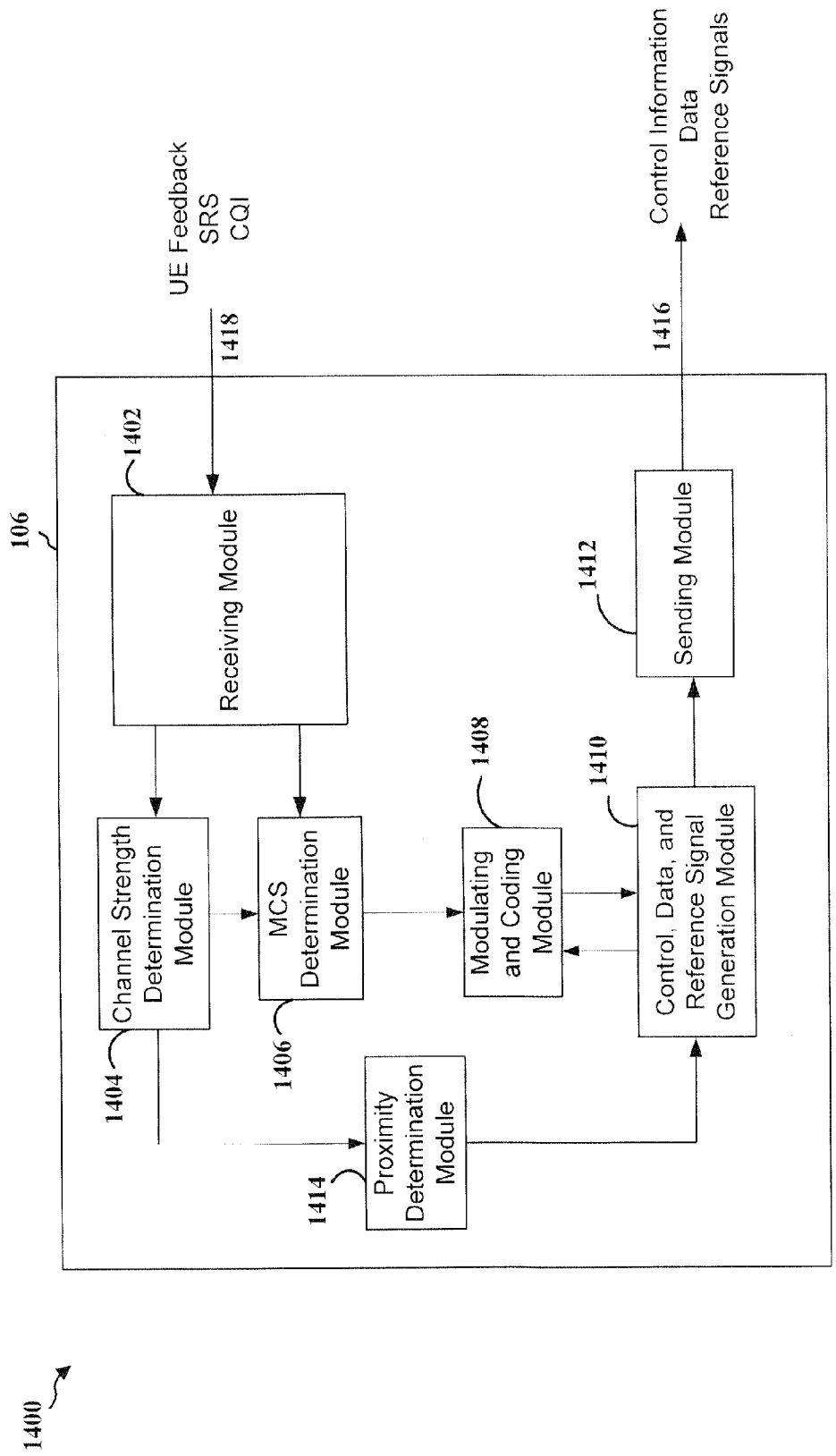
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 106. The exemplary apparatus 106 may include a plurality of transmission/reception points (TxPs) or points, such as a macro node and a plurality of geographically displaced remote radio heads (RRHs) coupled to the macro node. The apparatus 106 includes a receiving module 1402 that receives various signals 1418, such as UE feedback, sounding reference signals (SRS) and a channel quality indicator (CQI), for example. The apparatus also includes various modules that process signals received by the receiving module 1402, such as a channel strength determination module 1404, a modulation and coding scheme (MCS) determination module 1406, a modulating and coding module 1408, a control, data, and reference signal (CDR) generation module 1410, and a proximity determination module 1414. The apparatus further includes a sending module 1412 that transmits or sends various signals 1416, such as control information, data, CRS, UE-RS, and CSI-RS, for example.

In an aspect, the CDR generation module 1410 may generate control information and transmit the control information with common reference signals (CRS) to a UE from a first subset of points via the sending module 1412. The CDR generation module 1410 may also generate data and send the data to the UE based on UE-specific reference signals (e.g., demodulation reference signals (DM-RS)) from a second subset of points via the sending module 1412. The CDR generation module 1410 may further generate channel state information reference signals (CSI-RS) and send the CSI-RS to the UE from the second subset of points via the sending module 1412. The receiving module 1402 may receive feedback, such as a channel state information report, based at least in part on the CSI-RS from the UE. The channel state information report may include precoding matrix indicator (PMI), rank index (RI), or channel quality indicator (CQI) feedback.

In another aspect, the receiving module 1402 may receive a sounding reference signal (SRS) and channel quality indicator (CQI) feedback from the UE at one or more points of the plurality of points. The receiving module 1402 may send the received SRS to the channel strength determination module 1404, wherein the channel strength determination module 1404 may determine channel strengths at each of the one or more points from the UE based on the received SRS. The MCS determination module 1406 may determine a modulation and coding scheme (MCS) for data to be transmitted to the UE based on the channel strengths determined by the channel strength determination module 1404 and the CQI received by the receiving module 1402. Thereafter, based on the MCS determined by the MCS determination module 1406, the modulating and coding module 1408 modulates and codes the data to be transmitted.

In a further aspect, the CDR generation module 1410 may generate control information and transmit the control information with CRS to the UE from a subset of points via the sending module 1412. Moreover, the receiving module 1402 may receive a sounding reference signal (SRS) from the UE at one or more points of the plurality of points. The receiving module 1402 may send the received SRS to the channel strength determination module 1404, wherein the channel strength determination module 1404 may determine channel strengths at each of the one or more points from the UE based on the received SRS. Based on the determined channel strengths, the proximity determination module 1414 may determine whether the UE is in close proximity to at least one point of the one or more points. Thereafter, if the UE is determined to be in close proximity to the at least one point, the CDR generation module 1410 may send a data transmission based on CRS to the UE from the at least one point via the sending module 1412. The sending module 1412 may send the data transmission based on CRS to the UE from the at least one point independent of data transmissions from points not in close proximity to the UE.

In yet another aspect, the CDR generation module 1410 may generate second control information and transmit the control information with a second CRS to a UE from a designated point via the sending module 1412. The designated point may be a point in a plurality of points but not in the first subset of points. Also, the designated point may have a different cell identifier from any other point in the plurality of points.

Figure 15:
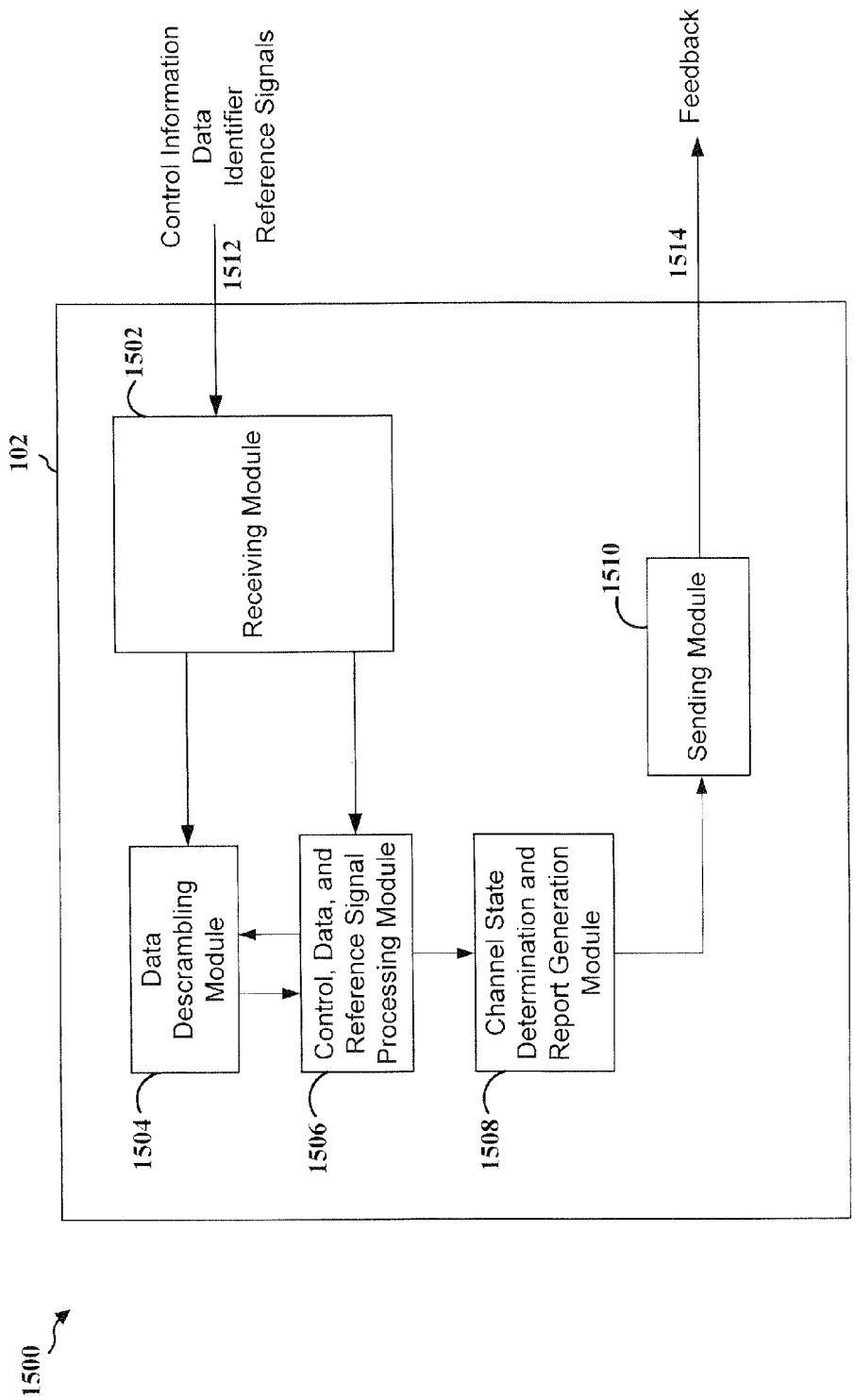
FIG. 15 is a conceptual data flow diagram illustrating the data flow between different modules/means/components in an exemplary apparatus.

FIG. 15 is a conceptual data flow diagram 1500 illustrating the data flow between different modules/means/components in an exemplary apparatus 102. The exemplary apparatus 102 communicates with a plurality of transmission/reception points (TxPs) or points, such as a macro node and a plurality of geographically displaced remote radio heads (RRHs) coupled to the macro node. The apparatus 102 includes a receiving module 1502 that receives various signals 1512, such as control information, data, an identifier, CRS, UE-RS, and CSI-RS, for example. The apparatus also includes various modules that process signals received by the receiving module 1502, such as a data descrambling module 1504, a control, data, and reference signal (CDR) processing module 1506, and a channel state determination and report generation module 1508. The apparatus further includes a sending module 1510 that transmits or sends various signals 1514 including feedback information, for example.

In an aspect, the receiving module 1502 may receive control information with common reference signals (CRS) from a first subset of points. The receiving module 1502 may also receive data based on UE-specific reference signals (e.g., demodulation reference signals (DM-RS)) from a second subset of points. Any control information, data, or reference signals received by the receiving module 1502 may be sent to the CDR processing module 1506 for further processing. The CDR processing module 1506 may then send the control information, data, and/or reference signals to the channel state determination and report generation module 1508 to determine a channel state.

In another aspect, the receiving module 1502 may receive an identifier from the first subset of points, wherein the identifier is different from a cell identifier associated with the first subset of points. Accordingly, the data descrambling module 1504 may descramble the data received from the second subset of points based on the identifier received by the receiving module 1502. Thereafter, the data descrambling module 1504 may send the descrambled data to the CDR processing module 1506 for further processing.

In a further aspect, the receiving module 1502 may receive channel state information reference signals (CSI-RS) from the second subset of points, and sends the received CSI-RS to the CDR processing module 1506. Based on information received from the CDR processing module 1506, the channel state determination and report generation module 1508 may determine a channel state and generates a channel state information report. The channel state information report may include at least one of precoding matrix indicator (PMI), rank index (RI), or channel quality indicator (CQI) feedback. The channel state determination and report generation module 1508 may also receive the CSI-RS from the CDR processing module 1508. Thereafter, the channel state determination and report generation module 1508 may transmit the channel state information report based on the CSI-RS via the sending module 1510.

The apparatus may include additional modules that perform each of the steps of the algorithm in the aforementioned flow charts FIGS. 10-13. As such, each step in the aforementioned flow charts FIGS. 10-13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
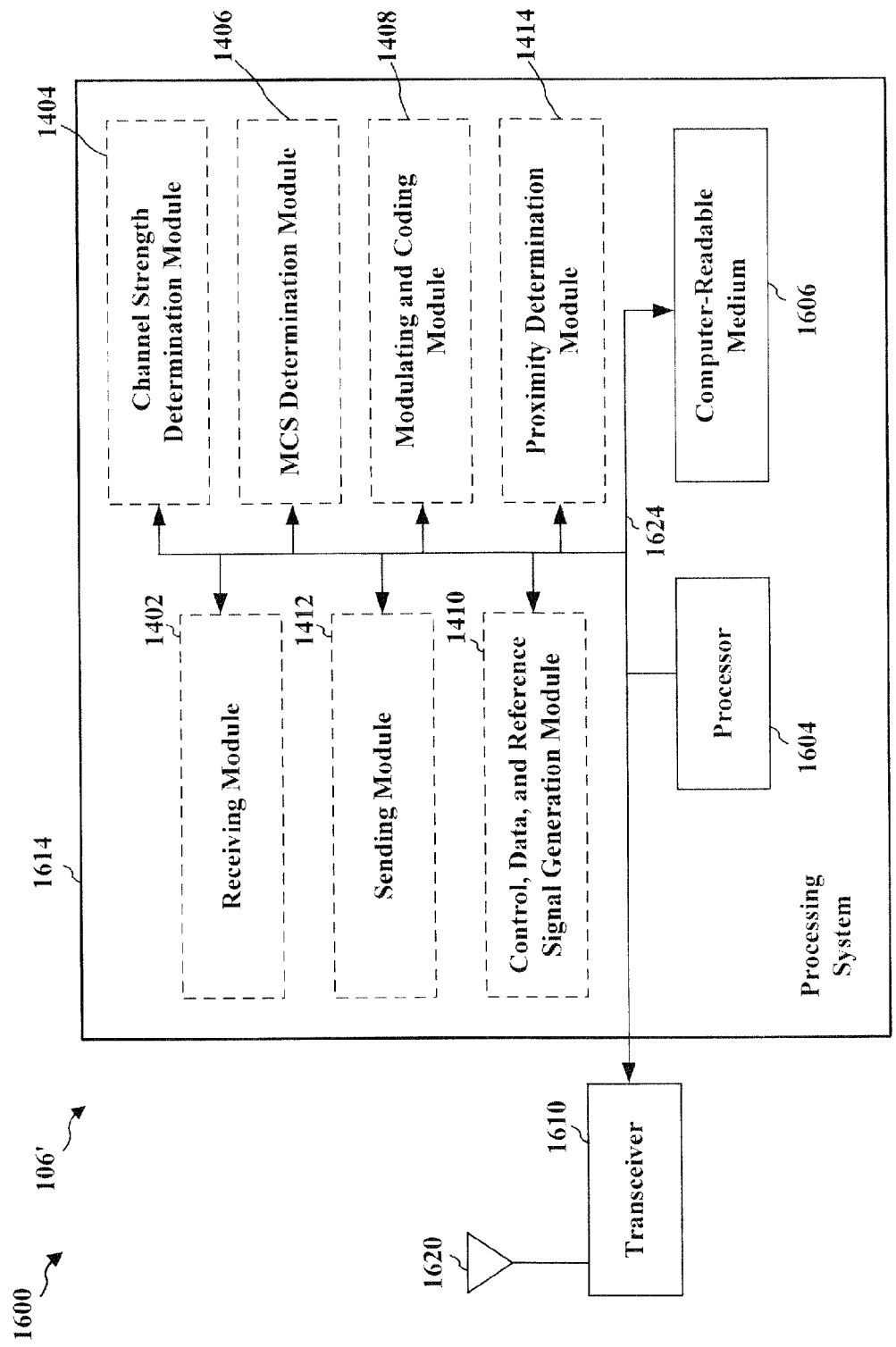
FIG. 16 is a diagram illustrating an example of a hardware implementation for an apparatus employing a processing system.

FIG. 16 is a diagram illustrating an example of a hardware implementation for an apparatus 106' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1604, the modules 1402, 1404, 1406, 1408, 1410, 1412, 1414, and the computer-readable medium 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The processing system 1614 includes a processor 1604 coupled to a computer-readable medium 1606. The processor 1604 is responsible for general processing, including the execution of software stored on the computer-readable medium 1606. The software, when executed by the processor 1604, causes the processing system 1614 to perform the various functions described supra for any particular apparatus. The computer-readable medium 1606 may also be used for storing data that is manipulated by the processor 1604 when executing software. The processing system further includes at least one of the modules 1402, 1404, 1406, 1408, 1410, 1412, and 1414. The modules may be software modules running in the processor 1604, resident/stored in the computer readable medium 1606, one or more hardware modules coupled to the processor 1604, or some combination thereof. The processing system 1614 may be a component of the eNB 610 and may include the memory 676 and/or at least one of the TX processor 616, the RX processor 670, and the controller/processor 675.

In one configuration, the apparatus 106/106' for wireless communication includes means for transmitting control information with common reference signals (CRS) to a user equipment (UE) from a first subset of the points, means for sending a data transmission based on UE-specific reference signals (e.g., demodulation reference signals (DM-RS)) to the UE from a second subset of the points, means for transmitting second control information and a second CRS from a designated point, the designated point being a point in a plurality of points but not in the first subset of points, and the designated point having a different cell identifier from any other point in the plurality of points, means for transmitting channel state information reference signals (CSI-RS) to the UE from the second subset of points, means for receiving a channel state information report from the UE based at least in part on the CSI-RS, the channel state information report comprising at least one of precoding matrix indicator (PMI), rank index (RI), or channel quality indicator (CQI) feedback, means for receiving a sounding reference signal (SRS) from the UE at one or more points of the plurality of points, means for determining channel strengths at each of the one or more points from the UE based on the SRS received by the one or more points, means for receiving channel quality indicator (CQI) feedback from the UE, means for determining a modulation and coding scheme (MCS) based on the determined channel strengths and the CQI, and means for modulating and coding the data based on the MCS.

In another configuration, the apparatus 106/106' for wireless communication includes means for transmitting control information with common reference signals (CRS) to a user equipment (UE) from a subset of points, means for receiving a sounding reference signal (SRS) from the UE at one or more points of the plurality of points, means for determining channel strengths to each of the one or more points from the UE based on the SRS received by the one or more points, means for determining whether the UE is in close proximity to at least one point of the one or more points based on the determined channel strengths, and means for sending a data transmission based on CRS to the UE from the at least one point when the UE is determined to be in close proximity to the at least one point based on the determined channel strengths, wherein the data transmission based on CRS is sent to the UE from the at least one point independent of data transmissions from points not in close proximity to the UE.

The aforementioned means may be one or more of the aforementioned modules of the apparatus 106 and/or the processing system 1614 of the apparatus 106' configured to perform the functions recited by the aforementioned means. As described supra, the processing system 1614 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 17:
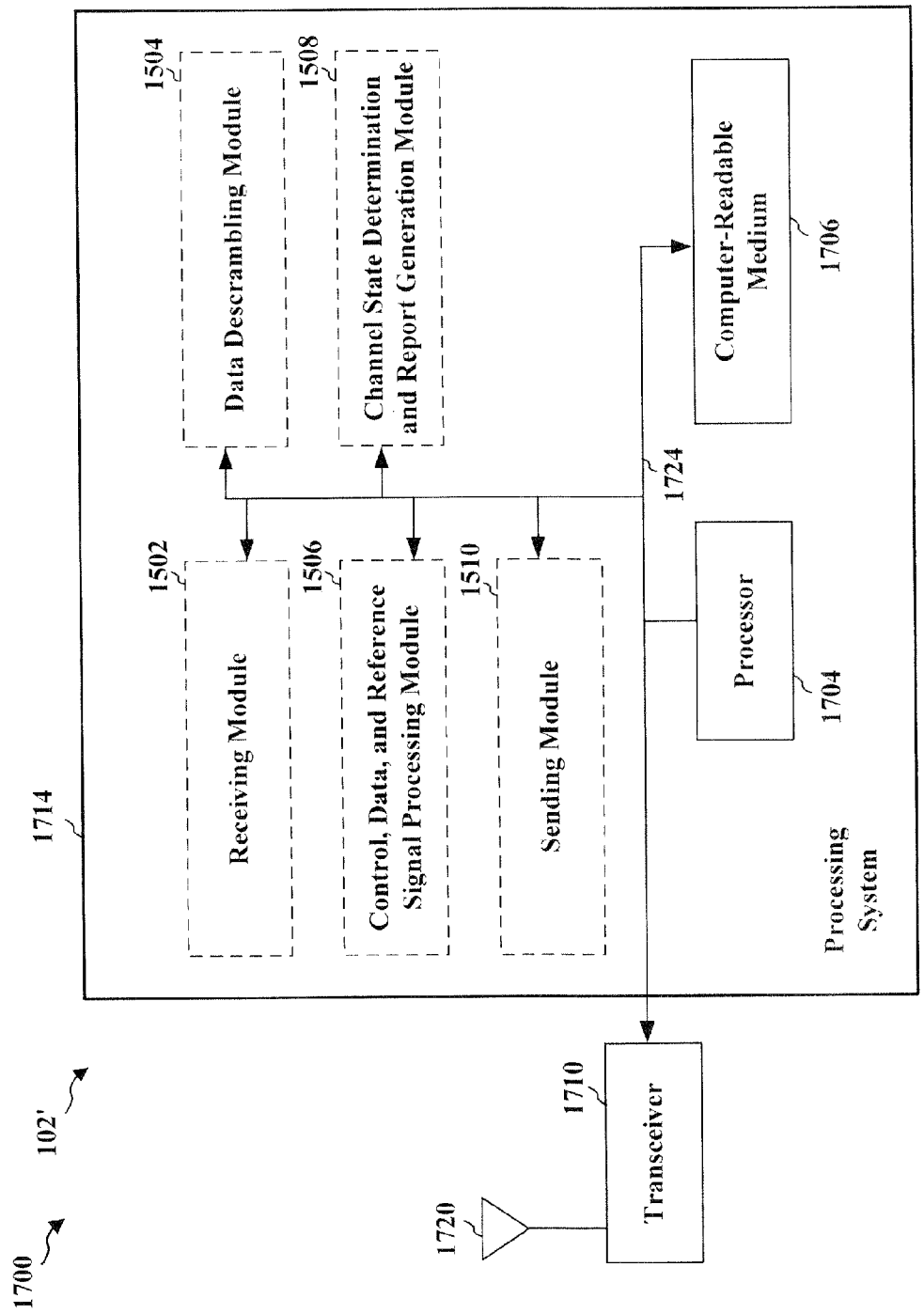
FIG. 17 is a diagram illustrating an example of a hardware implementation for an apparatus employing a processing system.

FIG. 17 is a diagram illustrating an example of a hardware implementation for an apparatus 102' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1704, the modules 1502, 1504, 1506, 1508, 1510, and the computer-readable medium 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The processing system 1714 includes a processor 1704 coupled to a computer-readable medium 1706. The processor 1704 is responsible for general processing, including the execution of software stored on the computer-readable medium 1706. The software, when executed by the processor 1704, causes the processing system 1714 to perform the various functions described supra for any particular apparatus. The computer-readable medium 1706 may also be used for storing data that is manipulated by the processor 1704 when executing software. The processing system further includes at least one of the modules 1502, 1504, 1506, 1508, and 1510. The modules may be software modules running in the processor 1704, resident/stored in the computer readable medium 1706, one or more hardware modules coupled to the processor 1704, or some combination thereof. The processing system 1714 may be a component of the UE 650 and may include the memory 660 and/or at least one of the TX processor 668, the RX processor 656, and the controller/processor 659.

In one configuration, the apparatus 102/102' for wireless communication includes means for receiving control information with common reference signals (CRS) from a first subset of points, means for receiving data transmitted based on user equipment (UE)-specific reference signals (e.g., demodulation reference signals (DM-RS)) from a second subset of points, means for receiving channel state information reference signals (CSI-RS) from the second subset of points, means for transmitting a channel state information report based on the received CSI-RS, the channel state information report comprising at least one of precoding matrix indicator (PMI), rank index (RI), or channel quality indicator (CQI) feedback, means for receiving an identifier from the first subset of points, the identifier being different from a cell identifier associated with the first subset of points, and means for descrambling the received data from the second subset of points based on the received identifier.

The aforementioned means may be one or more of the aforementioned modules of the apparatus 102 and/or the processing system 1714 of the apparatus 102' configured to perform the functions recited by the aforementioned means. As described supra, the processing system 1714 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of a macro node and at least one remote radio head (RRH) coupled to the macro node, the macro node and the at least one RRH comprising a plurality of points that are geographically displaced within a cell of the macro node, the method comprising:
configuring, using one or more processors, channel state information reference signals (CSI-RS) for a user equipment (UE) to perform interference estimation;
transmitting, using the one or more processors, control information and common reference signals (CRS) associated with a first cell identifier to the UE from a first subset of points that are geographically displaced within the cell of the macro node; and
sending, using the one or more processors, the CSI-RS and a data transmission associated with a second cell identifier to the UE from a second subset of points that are geographically displaced within the cell of the macro node, the second subset of points being configured to use ports within a group of ports when sending the CSI-RS to the UE, wherein each of the second subset of points sends the CSI-RS to the UE on different ports within the group of ports,
wherein the first cell identifier is different than the second cell identifier.

2. The method of claim 1, wherein the first subset of points has the same cell identifier and each point in the first subset of points transmits the same control information and CRS.

3. The method of claim 1, further comprising:
transmitting second control information and a second CRS from a designated point, the designated point being a point in the plurality of points but not in the first subset of points, and the designated point having a different cell identifier from any other point in the plurality of points.

4. The method of claim 1, further comprising receiving a channel state information report from the UE based at least in part on the CSI-RS, the channel state information report comprising at least one of precoding matrix indicator (PMI), rank index (RI), or channel quality indicator (CQI) feedback.

5. The method of claim 4, wherein the received channel state information report, comprising PMI, RI, or CQI feedback, is based on channel conditions from the second subset of points to the UE and interference conditions at the UE.

6. The method of claim 1, wherein the control information is transmitted using at least one of a frequency division multiplexed (FDM) control channel or a relay physical downlink control channel (R-PDCCH).

7. The method of claim 1, wherein the first subset of points comprises the macro node and zero or more RRHs, and the second subset of points comprises the macro node and/or one or more RRHs.

8. The method of claim 1, further comprising:
receiving a sounding reference signal (SRS) from the UE at one or more points of the plurality of points;
determining channel strengths at each of the one or more points from the UE based on the SRS received by the one or more points;
receiving channel quality indicator (CQI) feedback from the UE;
determining a modulation and coding scheme (MCS) based on the determined channel strengths and the CQI; and
modulating and coding the data based on the MCS.

9. A method of a user equipment (UE) communicating with a macro node and at least one remote radio head (RRH) coupled to the macro node, the macro node and the at least one RRH comprising a plurality of points that are geographically displaced within a cell of the macro node, the method comprising:
receiving, using one or more processors, control information and a common reference signal (CRS) associated with a first cell identifier from a first subset of points that are geographically displaced within the cell of the macro node;
receiving, using the one or more processors, data transmitted based on UE-specific demodulation reference signals (DM-RS) associated with a second cell identifier from a second subset of points that are geographically displaced within the cell of the macro node;
receiving, using the one or more processors, channel state information reference signals (CSI-RS) from the second subset of points, the second subset of points being configured to use ports within a group of ports when sending the CSI-RS to the UE, wherein each of the second subset of points sends the CSI-RS to the UE on different ports within the group of ports;
performing, using the one or more processors, interference estimation based on CSI-RS; and transmitting, using the one or more processors, a channel state information report based at least in part on the received first CSI-RS, the channel state information report comprising at least one of precoding matrix indicator (PMI), rank index (RI), or channel quality indicator (CQI) feedback,
wherein the first cell identifier is different than the second cell identifier.

10. The method of claim 9, wherein the first subset of points comprises the macro node and zero or more RRHs, and the second subset of points comprises the macro node and/or one or more RRHs.

11. The method of claim 9, further comprising:
receiving an identifier from the first subset of points, the identifier being different from a cell identifier associated with the first subset of points; and
descrambling the received data from the second subset of points based on the received identifier.

12. The method of claim 9, wherein the transmitted channel state information report, comprising PMI, RI, or CQI feedback, is based on channel conditions from the second subset of points to the UE and interference conditions at the UE.

13. An apparatus for wireless communication comprising a plurality of points that are geographically displaced within a cell of a macro node, the plurality of points comprising the macro node and a plurality of remote radio heads (RRHs) coupled to the macro node, the apparatus further comprising:
means for configuring channel state information reference signals (CSI-RS) for a user equipment (UE) to perform interference estimation;
means for transmitting control information and common reference signals (CRS) associated with a first cell identifier to the UE from a first subset of points that are geographically displaced within the cell of the macro node; and
means for sending the CSI-RS and a data transmission associated with a second cell identifier to the UE from a second subset of points that are geographically displaced within the cell of the macro node, the second subset of points being configured to use ports within a group of ports when sending the CSI-RS to the UE, wherein each of the second subset of points sends the CSI-RS to the UE on different ports within the group of ports,
wherein the first cell identifier is different than the second cell identifier.

14. The apparatus of claim 13, wherein the first subset of points has a same cell identifier and each point in the first subset of points transmits the same control information and CRS.

15. The apparatus of claim 13, further comprising:
means for transmitting second control information and a second CRS from a designated point, the designated point being a point in the plurality of points but not in the first subset of points, and the designated point having a different cell identifier from any other point in the plurality of points.

16. The apparatus of claim 13, further comprising means for receiving a channel state information report from the UE based at least in part on the CSI-RS, the channel state information report comprising at least one of precoding matrix indicator (PMI), rank index (RI), or channel quality indicator (CQI) feedback.

17. The apparatus of claim 16, wherein the received channel state information report, comprising PMI, RI, or CQI feedback, is based on channel conditions from the second subset of points to the UE and interference conditions at the UE.

18. The apparatus of claim 13, wherein the control information is transmitted using at least one of a frequency division multiplexed (FDM) control channel or a relay physical downlink control channel (R-PDCCH).

19. The apparatus of claim 13, wherein the first subset of points comprises the macro node and zero or more RRHs, and the second subset of points comprises the macro node and/or one or more RRHs.

20. The apparatus of claim 13, further comprising:
means for receiving a sounding reference signal (SRS) from the UE at one or more points of the plurality of points;
means for determining channel strengths at each of the one or more points from the UE based on the SRS received by the one or more points;
means for receiving channel quality indicator (CQI) feedback from the UE;
means for determining a modulation and coding scheme (MCS) based on the determined channel strengths and the CQI; and
means for modulating and coding the data based on the MCS.

21. An apparatus for wireless communication, the apparatus communicating with a plurality of points that are geographically displaced within a cell of a macro node, the plurality of points comprising the macro node and a plurality of remote radio heads (RRHs) coupled to the macro node, the apparatus comprising:
means for receiving control information and a common reference signal (CRS) associated with a first cell identifier from a first subset of points that are geographically displaced within the cell of the macro node;
means for receiving data transmitted based on UE-specific demodulation reference signals (DM-RS) associated with a second cell identifier from a second subset of points that are geographically displaced within the cell of the macro node;
means for receiving channel state information reference signals (CSI-RS) from the second subset of points, the second subset of points being configured to use ports within a group of ports when sending the CSI-RS to the UE, wherein each of the second subset of points sends the CSI-RS to the UE on different ports within the group of ports; and
means for transmitting a channel state information report based at least in part on the received first CSI-RS, the channel state information report comprising at least one of precoding matrix indicator (PMI), rank index (RI), or channel quality indicator (CQI) feedback,
wherein the first cell identifier is different than the second cell identifier.

22. The apparatus of claim 21, wherein the first subset of points comprises the macro node and zero or more RRHs, and the second subset of points comprises the macro node and/or one or more RRHs.

23. The apparatus of claim 21, further comprising:
means for receiving an identifier from the first subset of points, the identifier being different from a cell identifier associated with the first subset of points; and
means for descrambling the received data from the second subset of points based on the received identifier.

24. The apparatus of claim 21, wherein the transmitted channel state information report, comprising PMI, RI, or CQI feedback, is based on channel conditions from the second subset of points to the UE and interference conditions at the UE.

25. An apparatus for wireless communication comprising a plurality of points that are geographically displaced within a cell of a macro node, the plurality of points comprising the macro node and a plurality of remote radio heads (RRHs) coupled to the macro node, the apparatus further comprising:
a memory; and
a processing system coupled to the memory and configured to:
configure channel state information reference signals (CSI-RS) for a user equipment (UE) to perform interference estimation;
transmit control information and common reference signals (CRS) associated with a first cell identifier to the UE from a first subset of points that are geographically displaced within the cell of the macro node; and
send the CRI-RS and a data transmission associated with a second cell identifier to the UE from a second subset of points that are geographically displaced within the cell of the macro node, the second subset of points being configured to use ports within a group of ports when sending the CSI-RS to the UE, wherein each of the second subset of points sends the CSI-RS to the UE on different ports within the group of ports,
wherein the first cell identifier is different than the second cell identifier.

26. The apparatus of claim 25, wherein the first subset of points has a same cell identifier and each point in the first subset of points transmits the same control information and CRS.

27. The apparatus of claim 25, wherein the processing system is further configured to:
transmit second control information and a second CRS from a designated point, the designated point being a point in the plurality of points but not in the first subset of points, and the designated point having a different cell identifier from any other point in the plurality of points.

28. The apparatus of claim 25, wherein the processing system is further configured to receive a channel state information report from the UE based at least in part on the CSI-RS, the channel state information report comprising at least one of precoding matrix indicator (PMI), rank index (RI), or channel quality indicator (CQI) feedback.

29. The apparatus of claim 28, wherein the received channel state information report, comprising PMI, RI, or CQI feedback, is based on channel conditions from the second subset of points to the UE and interference conditions at the UE.

30. The apparatus of claim 25, wherein the control information is transmitted using at least one of a frequency division multiplexed (FDM) control channel or a relay physical downlink control channel (R-PDCCH).

31. The apparatus of claim 25, wherein the first subset of points comprises the macro node and zero or more RRHs, and the second subset of points comprises the macro node and/or one or more RRHs.

32. The apparatus of claim 25, wherein the processing system is further configured to:
receive a sounding reference signal (SRS) from the UE at one or more points of the plurality of points;
determine channel strengths at each of the one or more points from the UE based on the SRS received by the one or more points;
receive channel quality indicator (CQI) feedback from the UE;
determine a modulation and coding scheme (MCS) based on the determined channel strengths and the CQI; and
modulate and code the data based on the MCS.

33. An apparatus for wireless communication, the apparatus communicating with a plurality of points that are geographically displaced within a cell of a macro node, the plurality of points comprising the macro node and a plurality of remote radio heads (RRHs) coupled to the macro node, the apparatus comprising:
a memory; and
a processing system coupled to the memory and configured to:
receive control information and a common reference signal (CRS) associated with a first cell identifier from a first subset of points that are geographically displaced within the cell of the macro node;
receive data transmitted based on UE-specific demodulation reference signals (DM-RS) associated with a second cell identifier from a second subset of points that are geographically displaced within the cell of the macro node;
receive channel state information reference signals (CSI-RS) from the second subset of points, the second subset of points being configured to use ports within a group of ports when sending the CSI-RS to the UE, wherein each of the second subset of points sends the CSI-RS to the UE on different ports within the group of ports;
perform interference estimation based on CSI-RS; and
transmit a channel state information report based at least in part on the received first CSI-RS, the channel state information report comprising at least one of precoding matrix indicator (PMI), rank index (RI), or channel quality indicator (CQI) feedback,
wherein the first cell identifier is different than the second cell identifier.

34. The apparatus of claim 33, wherein the first subset of points comprises the macro node and zero or more RRHs, and the second subset of points comprises the macro node and/or one or more RRHs.

35. The apparatus of claim 33, wherein the processing system is further configured to:
receive an identifier from the first subset of points, the identifier being different from a cell identifier associated with the first subset of points; and
descramble the received data from the second subset of points based on the received identifier.

36. The apparatus of claim 33, wherein the transmitted channel state information report, comprising PMI, RI, or CQI feedback, is based on channel conditions from the second subset of points to the UE and interference conditions at the UE.

37. A non-transitory computer-readable medium for communicating with a plurality of points that are geographically displaced within a cell of a macro node, the plurality of points comprising the macro node and a plurality of remote radio heads (RRHs) coupled to the macro node, the computer-readable medium comprising code for:
configuring channel state information reference signals (CSI-RS) for a user equipment (UE) to perform interference estimation;
transmitting control information and common reference signals (CRS) associated with a first cell identifier to the UE from a first subset of points that are geographically displaced within the cell of the macro node; and sending the CSI-RS and a data transmission associated with a second cell identifier to the UE from a second subset of points that are geographically displaced within the cell of the macro node, the second subset of points being configured to use ports within a group of ports when sending the CSI-RS to the UE, wherein each of the second subset of points sends the CSI-RS to the UE on different ports within the group of ports, wherein the first cell identifier is different than the second cell identifier.

38. The non-transitory computer-readable medium of claim 37, wherein the first subset of points has a same cell identifier and each point in the first subset of points transmits the same control information and CRS.

39. The non-transitory computer-readable medium of claim 37, wherein the first subset of points comprises the macro node and zero or more RRHs, and the second subset of points comprises the macro node and/or one or more RRHs.

40. The non-transitory computer-readable medium of claim 37, further comprising code for:
    receiving a sounding reference signal (SRS) from the UE at one or more points of the plurality of points;
    determining channel strengths at each of the one or more points from the UE based on the SRS received by the one or more points;
    receiving channel quality indicator (CQI) feedback from the UE;
    determining a modulation and coding scheme (MCS) based on the determined channel strengths and the CQI; and
    modulating and coding the data based on the MCS.

41. A non-transitory computer-readable medium for communicating with a plurality of points that are geographically displaced within a cell of a macro node, the plurality of points comprising the macro node and a plurality of remote radio heads (RRHs) coupled to the macro node, the computer-readable medium comprising code for:

receiving control information and a common reference signal (CRS) associated with a first cell identifier from a first subset of points that are geographically displaced within the cell of the macro node;

receiving data transmitted based on UE-specific demodulation reference signals (DM-RS) associated with a second cell identifier from a second subset of points that are geographically displaced within the cell of the macro node;

receiving channel state information reference signals (CSI-RS) from the second subset of points, the second subset of points being configured to use ports within a group of ports when sending the CSI-RS to the UE, wherein each of the second subset of points sends the CSI RS to the UE on different ports within the group of ports by the second subset of ports;

performing interference estimation based on the CSI-RS; and transmitting a channel state information report based at least in part on the received first CSI-RS, the channel state information report comprising at least one of precoding matrix indicator (PMI), rank index (RI), or channel quality indicator (CQI) feedback, wherein the first cell identifier is different than the second cell identifier.

42. The non-transitory computer-readable medium of claim 41, wherein the first subset of points comprises the macro node and zero or more RRHs, and the second subset of points comprises the macro node and/or one or more RRHs.

43. The non-transitory computer-readable medium of claim 41, further comprising code for:
    receiving an identifier from the first subset of points, the identifier being different from a cell identifier associated with the first subset of points; and
    descrambling the received data from the second subset of points based on the received identifier.

* * * * *